Figure 2:
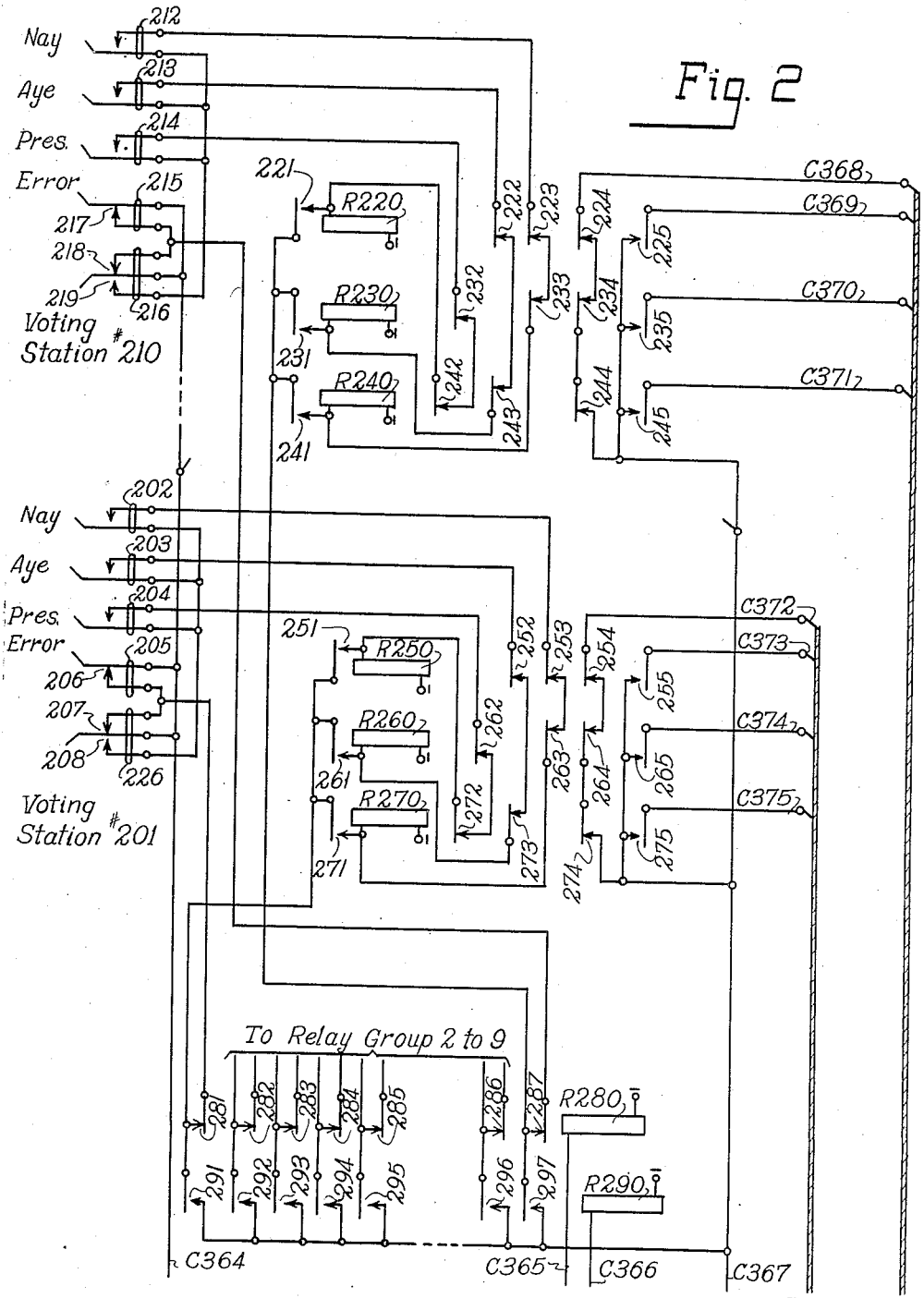

April 6, 1948.　　　　　L. F. CRABTREE　　　　　2,439,041
VOTE INDICATING SYSTEM
Filed Jan. 27, 1941　　　　13 Sheets-Sheet 1
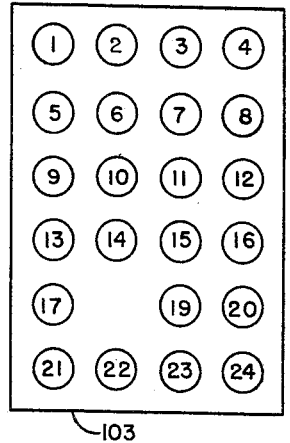
Fig. 13
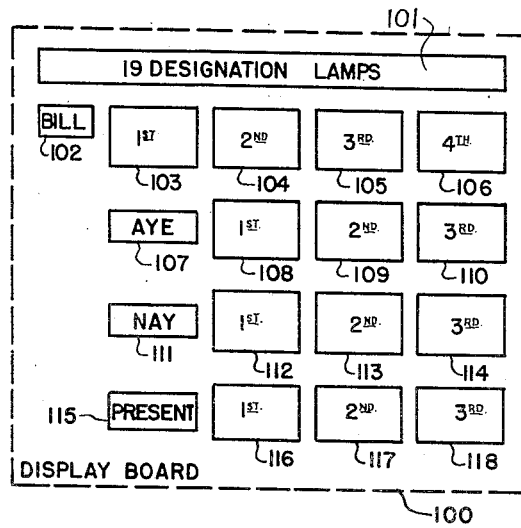
Fig. 1
| FIG. 2 | FIG. 4 | FIG. 6 | FIG. 8 | FIG. 10 | |
|---|---|---|---|---|---|
| FIG. 3 | FIG. 5 | FIG. 7 | FIG. 9 | FIG. 11 | FIG. 12 |
Fig. 15
INVENTOR.
Leonard F. Crabtree.
BY Davis, Lindsey, Smith & Shonts
ATTORNEYS April 6, 1948.  L. F. CRABTREE  2,439,041
VOTE INDICATING SYSTEM
Filed Jan. 27, 1941  13 Sheets-Sheet 3

INVENTOR.
Leonard F. Crabtree
BY Davis, Lindsey, Smith & Shonts
ATTORNEYS

April 6, 1948.   L. F. CRABTREE   2,439,041
VOTE INDICATING SYSTEM
Filed Jan. 27, 1941   13 Sheets-Sheet 4
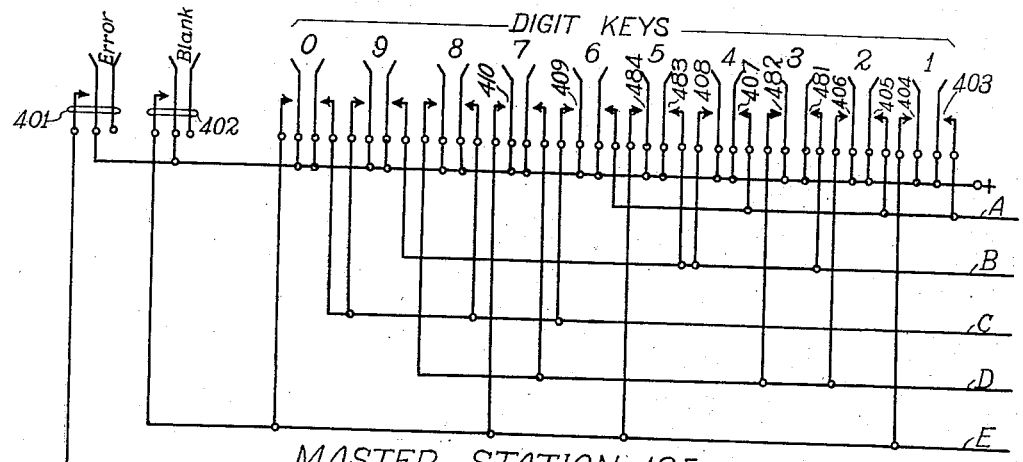
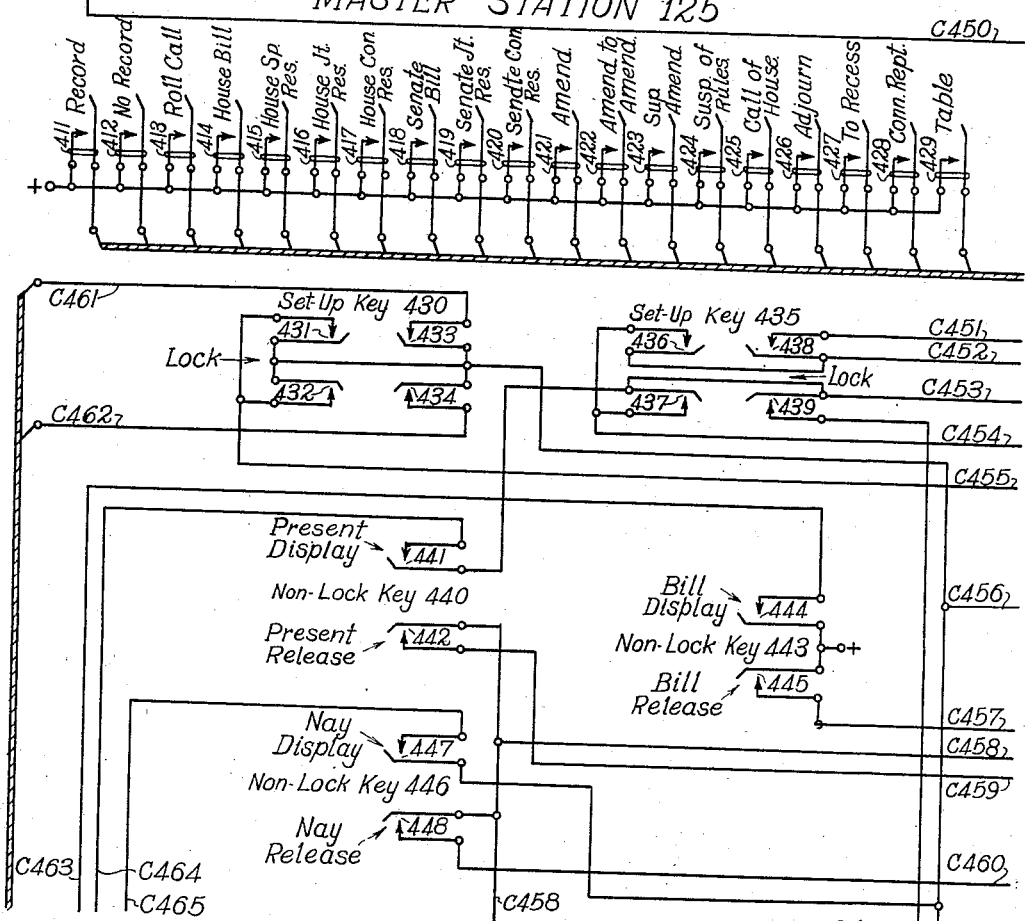
Fig. 4
INVENTOR.
Leonard F. Crabtree
BY Davis, Lindsey, Smith & Shonts
ATTORNEYS April 6, 1948.　　　L. F. CRABTREE　　　2,439,041
VOTE INDICATING SYSTEM
Filed Jan. 27, 1941　　　13 Sheets-Sheet 7

Fig. 7

INVENTOR.
Leonard F. Crabtree
BY Davis, Lindsey, Smith & Shonts
ATTORNEYS

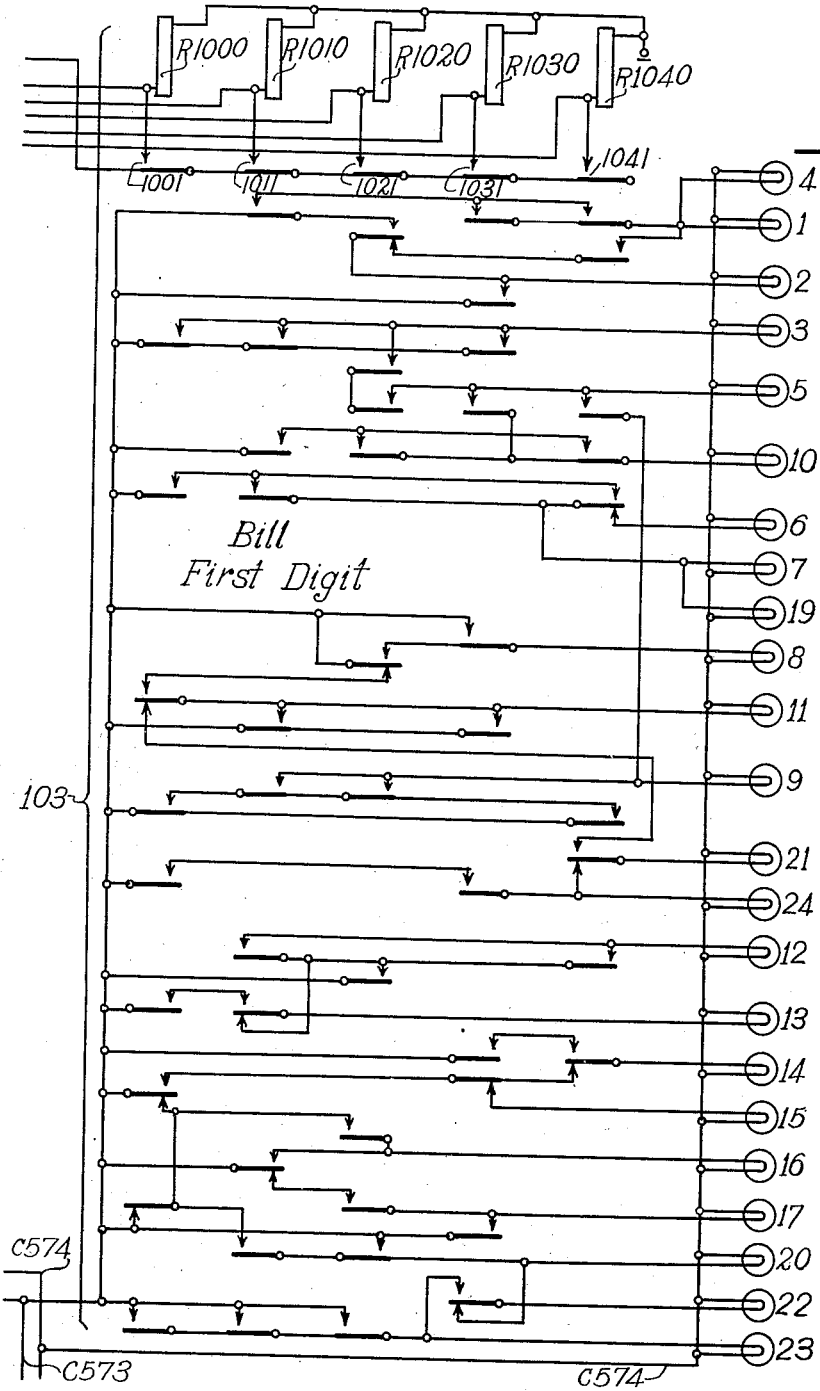

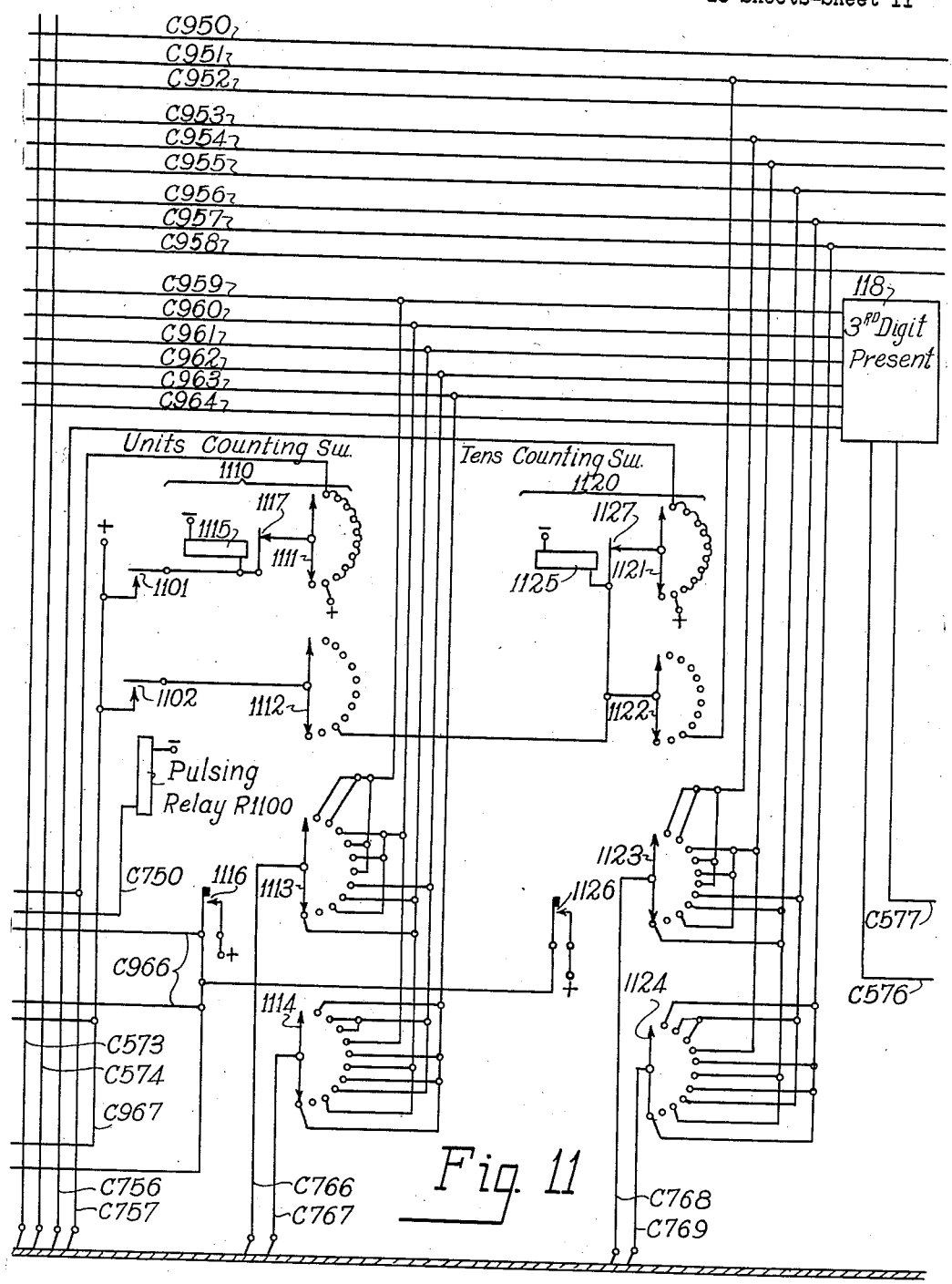

April 6, 1948.  L. F. CRABTREE  2,439,041
VOTE INDICATING SYSTEM
Filed Jan. 27, 1941  13 Sheets-Sheet 12
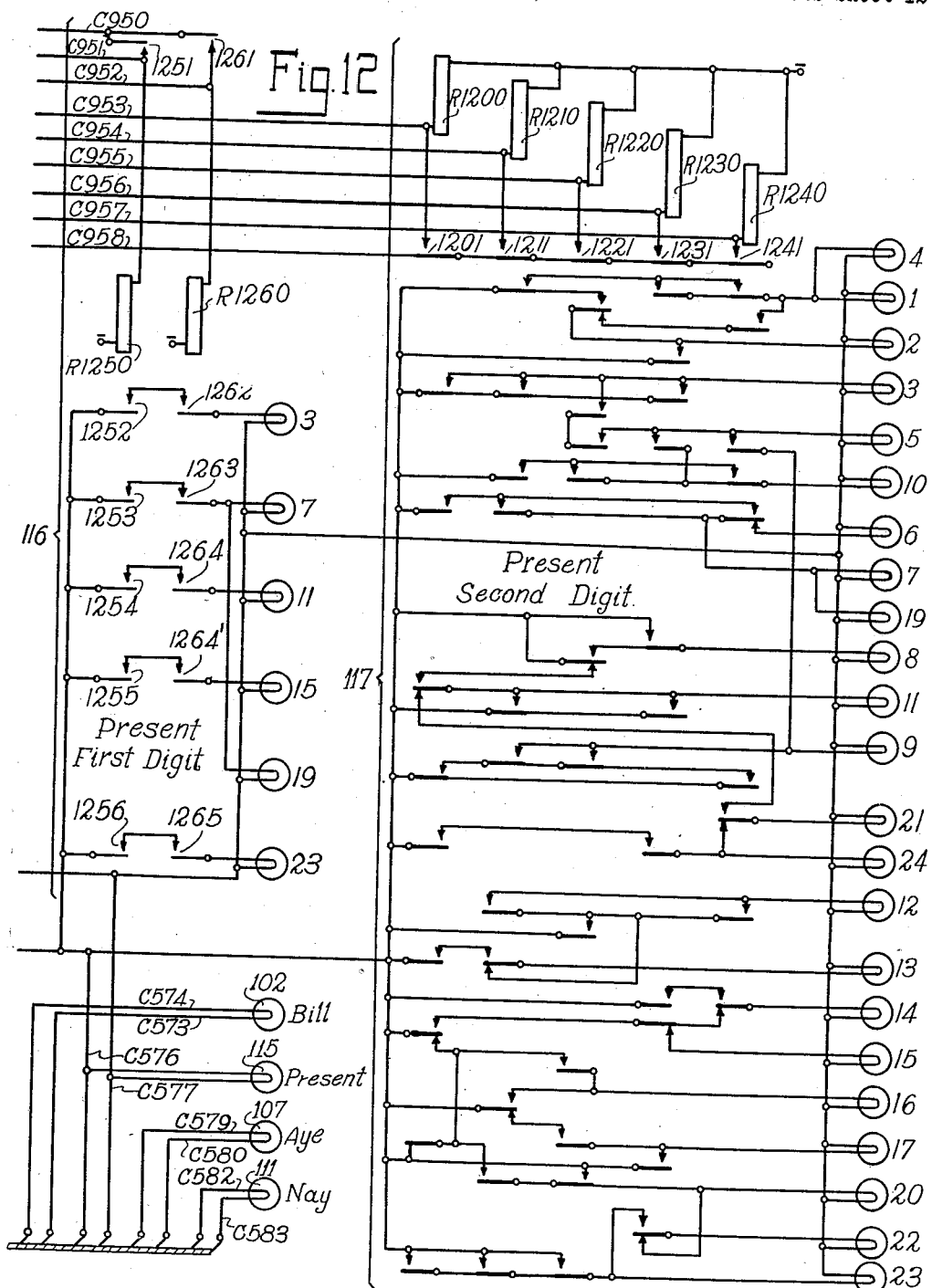
INVENTOR.
Leonard F. Crabtree
BY Davis, Lindsey, Smith & Shonts
ATTORNEYS April 6, 1948.  L. F. CRABTREE  2,439,041

VOTE INDICATING SYSTEM

Filed Jan. 27, 1941   13 Sheets-Sheet 13

| DIGIT | CODE LEADS USED | TRANSLATING RELAYS OPERATED | LAMPS ENERGIZED |
|---|---|---|---|
| 1 | A & E | 1 & 5 | 3, 7, 11, 15, 19 & 23 |
| 2 | A & D | 1 & 4 | 2, 3, 8, 11, 14, 17, 21, 22, 23 & 24 |
| 3 | B & D | 2 & 4 | 1, 2, 3, 4, 8, 11, 16, 17, 20, 22 & 23 |
| 4 | A & B | 1 & 2 | 3, 6, 7, 9, 11, 13, 14, 15, 16, 19 & 23 |
| 5 | B & E | 2 & 5 | 1, 2, 3, 4, 5, 9, 10, 11, 16, 20, 21, 22 & 23 |
| 6 | A & C | 1 & 3 | 2, 3, 5, 8, 9, 13, 14, 15, 17, 20, 22 & 23 |
| 7 | D & E | 4 & 5 | 1, 2, 3, 4, 8, 11, 14, 17 & 21 |
| 8 | C & D | 3 & 4 | 2, 3, 5, 8, 10, 11, 13, 16, 17, 20, 22 & 23 |
| 9 | B & C | 2 & 3 | 2, 3, 5, 8, 10, 11, 12, 16, 20, 22 & 23 |
| 0 | C & E | 3 & 5 | 2, 3, 5, 8, 9, 12, 16, 17, 20, 22 & 23 |
| BLANK | E | 5 ONLY | NONE |

Fig. 14

INVENTOR.
Leonard F. Crabtree
BY Davis, Lindsey, Smith & Shonts
ATTORNEYS

Patented Apr. 6, 1948

2,439,041

UNITED STATES PATENT OFFICE 2,439,041

VOTE INDICATING SYSTEM

Leonard F. Crabtree, Oak Park, Ill., assignor to Automatic Electric Laboratories, Inc., a corporation of Delaware Application January 27, 1941, Serial No. 376,183

16 Claims. (Cl. 235—52)

The present invention relates to indicating systems and, more particularly, to systems of the character used in legislative chambers for indicating to the public and the voters of the legislature the number identifying a bill or act under consideration, the total number of legislative votes favoring the bill, the total number of legislative votes opposing the bill, and the total number of voters present but not voting on the measure.

It is an object of the invention to provide a vote indicating system of the character described, which is positive, reliable and flexible in operation and is simple in arrangement.

It is another object of the invention to provide a system of the character described, which is so arranged that the totaling of votes cast at the individual voting stations of the system, and the display of the totals on the display board of the system, may be effected in a fully automatic manner.

It is a further object of the invention to provide a system of the character described, wherein provisions are made for automatically wiping out an existing display on the display board incident to a succeeding vote totaling operation.

It is another object of the invention to provide a system of the character indicated, which is so arranged that the posting of information on the display board may be entirely manually controlled or may be controlled in a fully automatic manner in accordance with the votes cast at the individual voting stations.

It is a further object of the invention to provide a system of the character described, which is so arranged that the votes cast at the voting stations are automatically totaled, and wherein provisions are made for either automatically displaying the vote totals on the display board or for manually controlling the display of the vote totals.

It is another object of the invention to provide a system of the character described, which is so arranged that the vote counting apparatus may be either automatically released or may be released under the manual control of a master station operator.

According to another object of the invention, a vote recorder is provided in the system for making a permanent record of the votes cast during the voting operation and for also controlling the operation of the vote counting apparatus.

In accordance with still another object of the invention, provisions are made whereby the vote recorder may be utilized automatically to control the set-up of a display in the display panel.

In accordance with a still further object of the invention, provisions are made whereby the recorder may be utilized automatically to control the release of the vote counting apparatus.

It is still another object of the invention to provide in a system of the character described, an improved and exceedingly simple arrangement for controlling the operation of the vote recorder in accordance with the votes cast at the individual voting stations.

It is a still further object of the invention to provide in a system of the character described, an arrangement for locking the voting stations out of service while a vote recording operation is in progress.

In the illustrated embodiment of the system there is provided a vote indicating system which comprises a plurality of individual voting stations, a display board including a plurality of display units, a master station for controlling the voting circuits individual to the voting stations and the operation of the display board, and a vote recorder which is operative to make a permanent record of the votes cast at the individual voting stations. The individual display units of the display board are provided for displaying the number identifying a bill under consideration, the Aye vote with respect to the bill, the Nay vote with respect to the bill, and the Present vote, the latter vote indicating the number of voters present who have not voted on the bill under consideration. Each of the voting stations is provided with Aye, Nay, and Present voting elements which are arranged to control Aye, Nay, and Present voting relays individual thereto. These voting relays, in turn, control voting circuits which extend to the vote recorder and serve to control the recorder in its vote recording operation. Suitable electrical interlocks are provided for preventing more than one of the voting relays individual to each station from being concurrently operated, thereby to prevent conflicting votes from being cast at any one station. Additional means are provided for locking out the voting stations by rendering the voting relays non-responsive to operation of the associated voting elements during a vote recording operation. The arrangement is such that after a vote recording operation is completed the voting relays, which have been operated to give the vote indication, are automatically released under the control of the recorder.

The display units of the display board are arranged for full manual control from the master station, semi-automatic control and full automatic control, as desired. More specifically, the master station is equipped with a set of digit keys and appropriate set-up, display, and release keys whereby any one or more of the display units may be manually controlled to display any desired number and any existing display may be wiped out. In all cases the Bill number display is set up and wiped out under the control of the master station operator. The primary utility of the automatic feature of the system pertains to the counting of the Aye, Nay, and Present votes with respect to a particular bill, in order separately to determine the respective Aye, Nay and Present vote totals. To this end, a plurality of counters in the form of pulse-controlled registers are provided, these registers being arranged to respond to operation of the recorder during a vote recording operation separately to total the votes of different character and to cause corresponding circuits to be set up for the display lamps of the associated display units, whereby the lamps required to display the individual vote totals may be energized. The actual display of the counted vote totals may be accomplished either automatically or manually, as desired. To this end, a transfer key is provided at the master station which is operable between three positions, two of which are reserved for automatic counting accompanied by manual control of the display, and automatic counting accompanied by automatic control of the display. With the transfer key in the first of the two positions mentioned, a second display key must be operated by the master station operator to effect energization of the lamps required to display the individual vote totals as determined by the various registers. With the transfer key in the other of the two positions mentioned, the recorder, upon concluding its vote recording operation, automatically effects the display by causing the energization of the lamps selected by the registers. Further to increase the flexibility of the system, provisions are made whereby the release of the vote counting registers and the wipe-out of an existing display may either be effected manually under the control of the master station operator or may be automatically effected under the control of the vote recorder. To this end, an additional transfer key is provided at the master station for selectively determining the type of release to be utilized.

The novel features believed to be characteristic of the invention are set forth with particularity in the appended claims. The invention, both as to its organization and method of operation, together with further objects and advantages thereof will best be understood by reference to the specification taken in connection with the accompanying drawings in which Fig. 1 illustrates the layout of the display board; Figs. 2 to 12, inclusive, when combined in the manner shown in Fig. 15, illustrate the major portion of the equipment provided for controlling the lamps of the display board shown in Fig. 1; Fig. 13 illustrates the lamp arrangement of one of the lamp panels incorporated in the display board shown in Fig. 1; and Fig. 14 graphically illustrates the permutation code arrangement of certain of the circuit leads and relays which are utilized in controlling the lamps of the display board.

Figure 3:
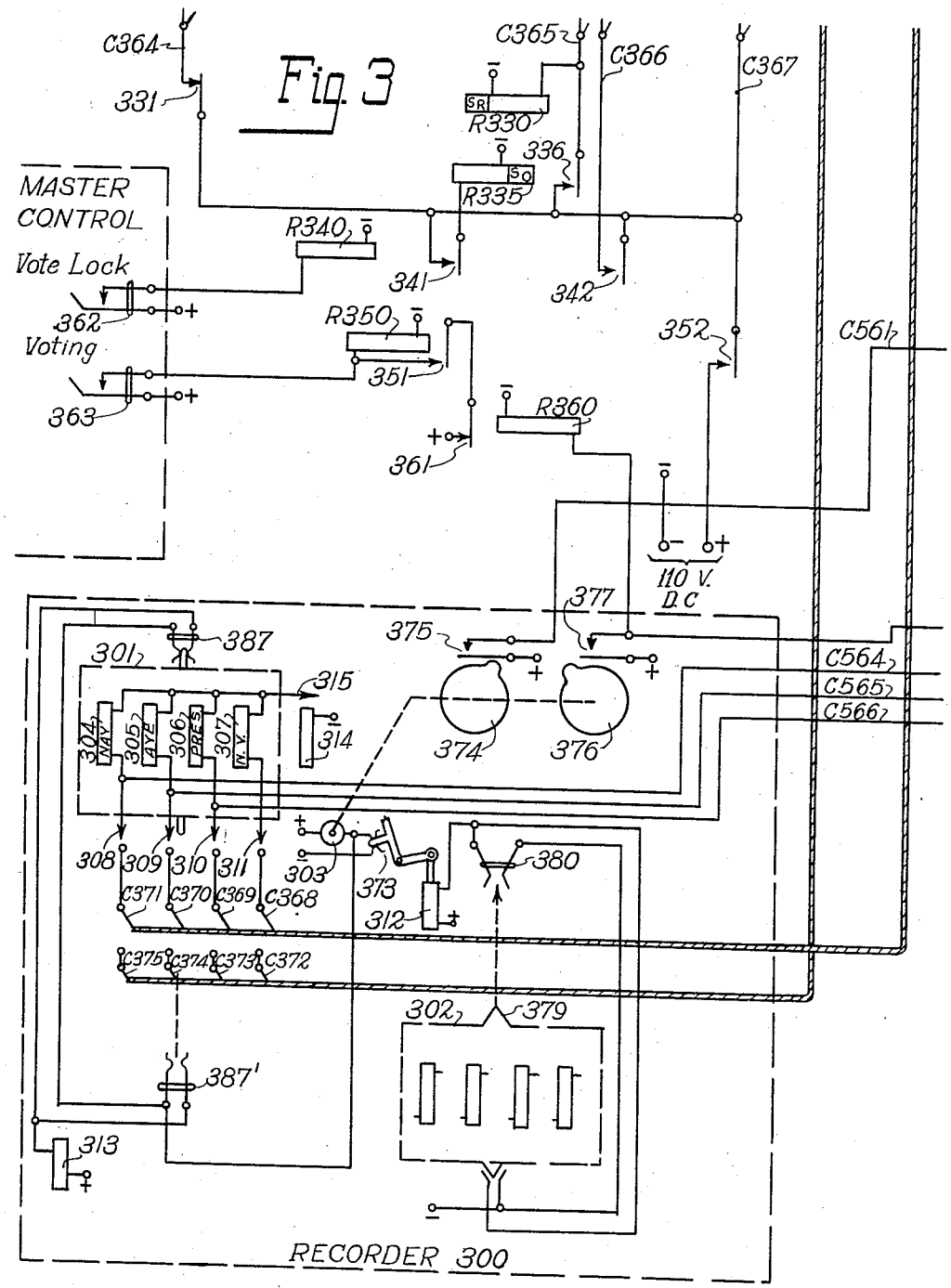
Figure 5:
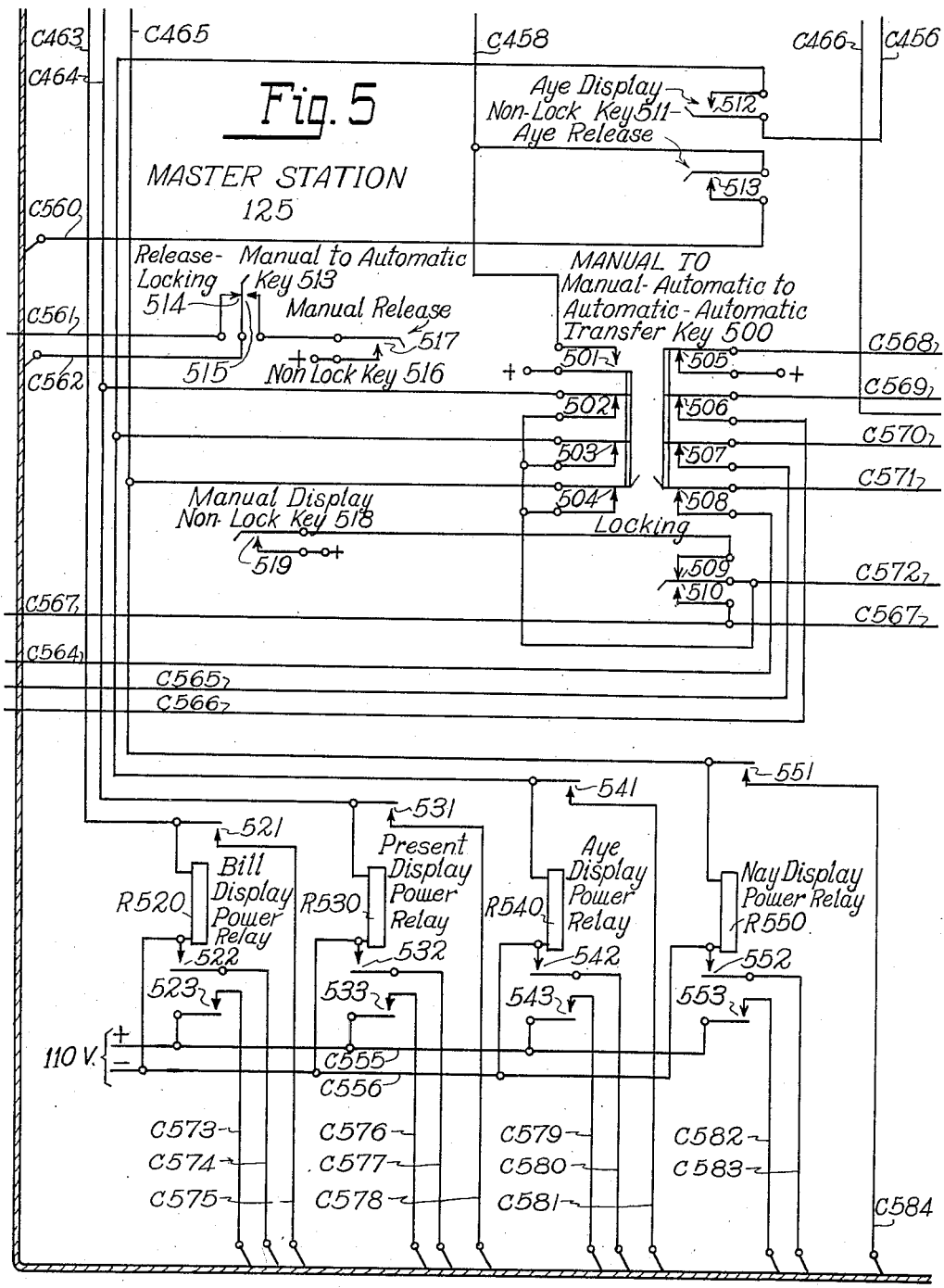
Figure 6:
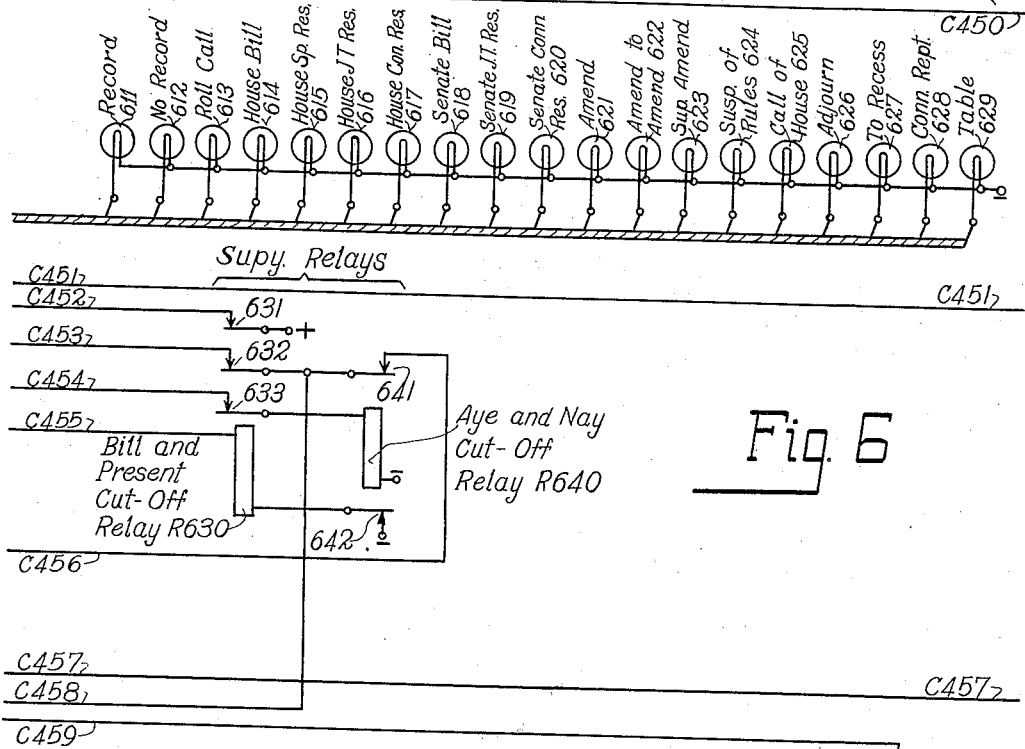
Figure 8:
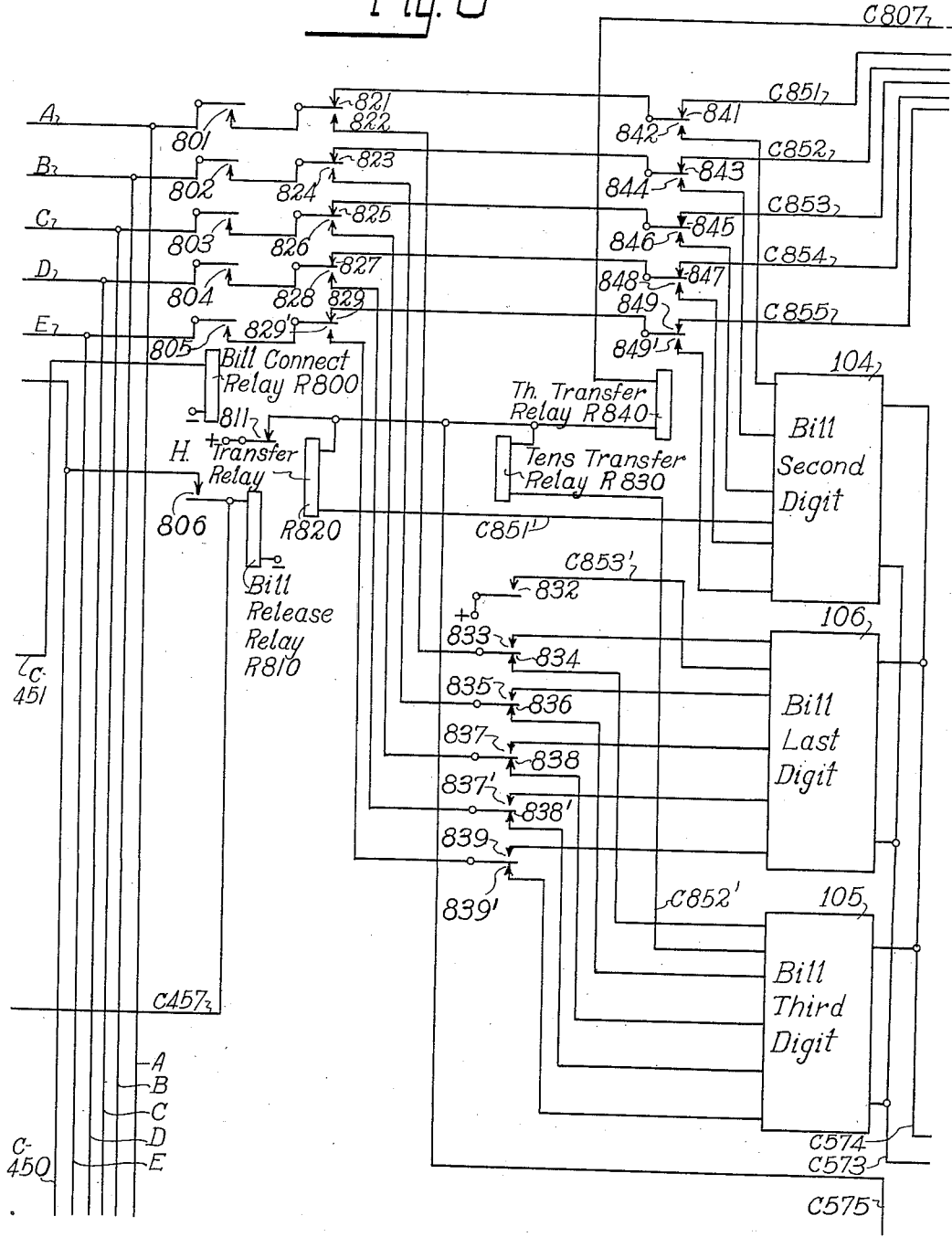
Figure 9:
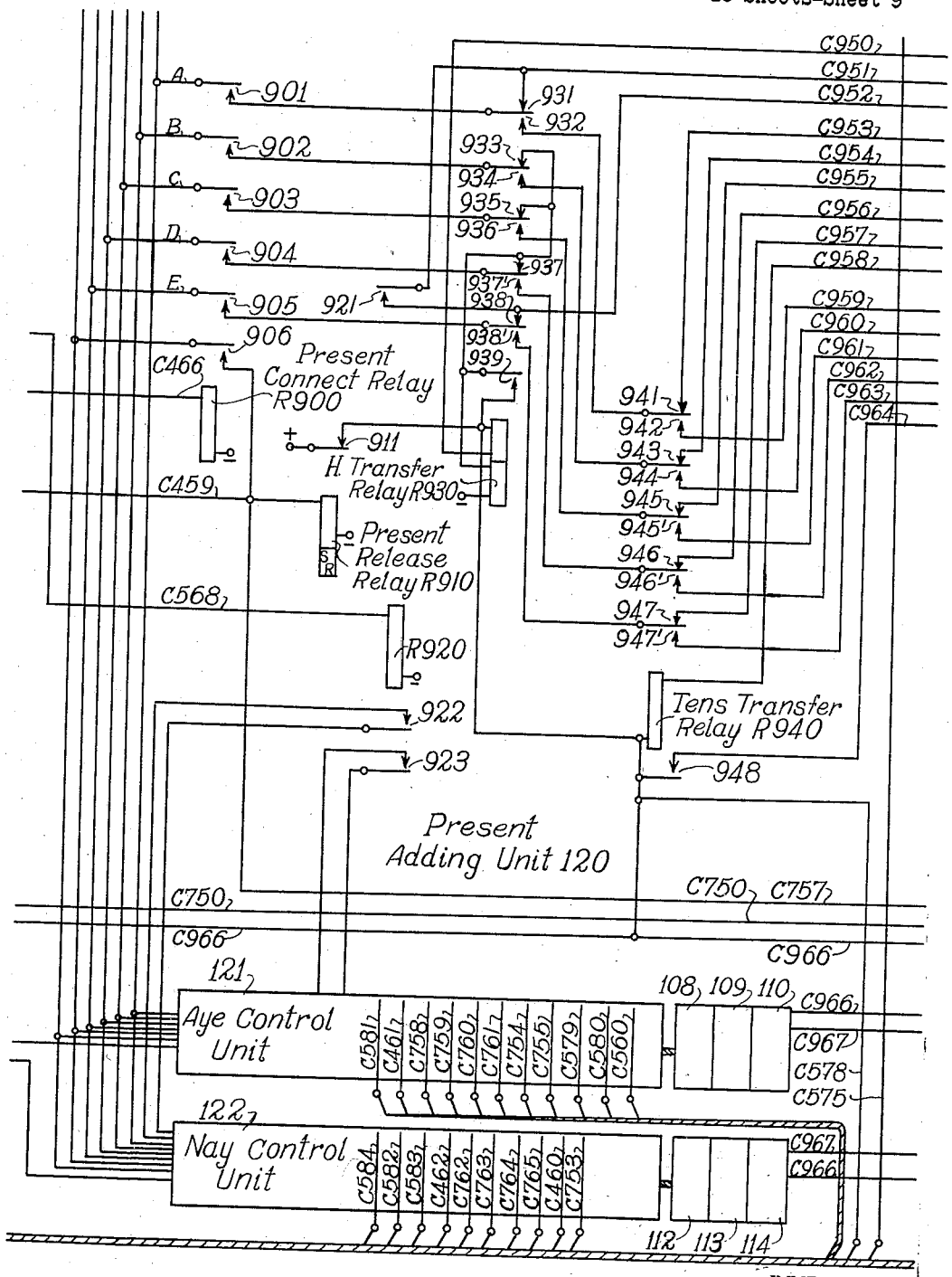

More particularly, Fig. 2 illustrates the equipment individual to two of the voting stations embodied in the system; Fig. 3 illustrates in schematic form the vote recorder and a portion of the equipment provided at the master control station for controlling the voting station equipment; Figs. 4 and 5 illustrate the circuit arrangement of the display power relays and the major portion of the control keys provided at the master station; Fig. 6 illustrates a portion of the display lamps and two of the supervisory relays included in the system; Fig. 7 illustrates common equipment utilized in automatically controlling the lamps of the display board; Figs. 8 and 10 illustrate the circuit arrangement of the equipment for controlling the lamps of the Bill display unit; and Figs. 9, 11 and 12 illustrate the circuit arrangement of the equipment provided for controlling the Present, Aye and Nay display units of the display board.

Referring now more particularly to the drawings, the vote recording and indicating system there illustrated comprises a display board 100, a recorder 300, a master station 125 equipped with suitable keys and switches for controlling the operation of the recorder and the display board, and a plurality of voting stations, two of which are indicated at 201 and 210. These stations are individually equipped with five keys through operation of which a station operator may register Present, Nay and Aye votes in the recorder 300 and may also nullify any previous registration. Thus the station 201 is illustrated as including a Nay key 202, an Aye key 203, a Present key 204, an Error key 205 and a Lock key 226. The first three keys are arranged respectively to control Present, Aye and Nay relays, R250, R260 and R270, through the selective operation of which corresponding registrations are made in the voting circuits extending to the recorder 300. The equipment individual to the voting station 210 similarly comprises a Nay key 212, an Aye key 213, a Present key 214, an Error key 215, a Lock key 216, and Aye, Nay and Present relays R230, R240 and R220, respectively. The various voting stations are, for control purposes, grouped in groups of ten each and a pair of group control relays are associated with each group of stations. Thus the two voting stations 201 and 210 are included in the same group and a group-open relay R280 and a group-lock relay R290 are provided for controlling the voting circuits and the relay operating and locking circuits individual to the stations of this group. Corresponding pairs of group relays are provided in association with the other groups of stations. The various group relays and the circuits common to all of the stations are, in turn, arranged to be controlled by a plurality of common relays which include a voting relay R350, a vote-lock relay R340, a release relay R360, and a pair of cut-off relays R330 and R335, the last of which is of the slow-to-operate type.

The vote recorder 300 is of the card perforating type and preferably is of the form illustrated and described in Patent No. 1,877,150, granted September 13, 1932, to Marshall F. Thompson. Briefly described, this recorder comprises a stationary card-carrying platen which is provided with perforations therethrough suitably arranged to index with the punching spaces of a vote record card having a standard vote record pattern inscribed thereon. Opposite each perforation in the platen there is provided a spring biased perforating plunger which, when depressed, serves to perforate a card placed in the card slot formed between the platen and the perforating ends of the plungers. These plungers are aligned to form four rows which respectively correspond to Aye, Nay, Present and Non-voting registrations. More specifically, each station has a set of plungers individual thereto, the set comprising an Aye plunger, a Nay plunger, a Present plunger and a Non-voting plunger. For the purpose of selectively operating the perforating plungers in accordance with the settings of the keys provided at the several stations, two traveling carriages 301 and 302 are provided which are of substantially similar construction. These carriages are arranged for alternate reciprocation between two extreme positions, across two sets of perforating plunger fields, under the control of worm drive mechanisms which are driven by a motor 303. Suitably interlocked mechanical and electromagnetic clutching arrangements are provided for initiating the travel of the two carriages. The two traveling carriages are substantially similar in mechanical construction, each thereof including four aligned plunger operating magnets which respectively correspond to the Aye, Nay, Present and Non-voting rows of perforating plungers. Thus the traveling carriage 301 comprises a Nay operating magnet 304, an Aye operating magnet 305, a Present operating magnet 306 and a Non-voting operating magnet 307. Each of these magnets, when energized as the carriage 301 is moved across the plunger field, operates an associated armature to actuate a marked one of the perforating plungers through its perforating position. For the purpose of selectively energizing the magnets 304 to 307, inclusive, in accordance with the settings of the keys provided at the various voting stations as the carriage 301 travels across the plunger field, a stationary marking contact field corresponding in pattern to the plunger field is provided which is traversed by the wipers 308, 309, 310 and 311 carried by the carriage 301. Each set of stationary contacts in the contact field includes four contacts which individually correspond to the four perforating plungers of an associated plunger set, i. e., each contact set and each plunger set correspond to a particular voting station. Additional circuit control and clutch control equipment embodied in the recorder 300 includes a contact or wiping bar 314, which is traversed by a wiper 315 carried by the carriage 301 as this carriage traverses the plunger and contact fields, a clutch control magnet 313, a master switch 373, and various sets of contact springs referred to more specifically hereinafter. The gear train forming the driving connection between the motor 303 and the worms for driving the two traveling carriages 301 and 302 also actuates two cams 374 and 376 which are arranged respectively to control the contact springs 375 and 377. The gear ratios of the gearing included in this driving connection are such that each of the cams 374 and 376 is driven through one revolution during each recording cycle of the recorder.

As best shown in Fig. 1 of the drawings, the display board 100 is equipped with nineteen designation lamps, indicated as a group at 101, which are disposed along the top of the board. Immediately below the designation lamps are four lamp panels 103, 104, 105 and 106 for respectively displaying the first, second, third and fourth digits of the Bill number which may be under consideration at any given time. This group of lamp panels constitutes one display unit and is indicated as being provided to display the Bill number through the provision of a Bill indicating lamp 102. Immediately below the Bill display lamp panels three lamp panels 108, 109 and 110 are provided which together constitute a second display unit and respectively display the first, second and third digits of the Aye vote totals. The identity of this display unit is designated by an Aye indicator lamp 107. Below the Aye display unit, three additional lamp panels 112, 113 and 114 are provided for displaying the three digits of Nay vote totals. The identity of this group of lamp panels is indicated by a Nay indicator lamp 111. Along the lowermost portion of the display board, three additional lamp panels 116, 117 and 118 are provided for displaying the three digits of Present vote totals, the identity of these panels being indicated by a Present indicator lamp 115.

The character of the individual lamp units 103 to 106, inclusive; 108 to 110, inclusive; 112 to 114, inclusive; and 116 to 118, inclusive, is illustrated in Fig. 13 of the drawings, all of these lamp panels, with the exception of the first digit panels 103, 112 and 116, being identical with the lamp panel arrangement there illustrated. As shown in Fig. 13, the lamp panel 103 comprises twenty-three lamps arranged to form six horizontal and four vertical rows. By selective energization of the lamps in this panel, any digital value from 1 to 9 and 0 may be displayed thereby. In the arrangement illustrated, the number capacity of the voting legislature is limited to 199 legislature members. Accordingly, there is no necessity for providing first-digit lamp panels 108, 112 and 116 for displaying any digit other than the digit 1. Hence only lamps arranged in vertical alignment and corresponding to the lamps 3, 7, 11, 15, 19 and 23 of the panel 103 are included in each of these first-digit panels, it being clearly apparent that the enumerated vertically aligned lamps when simultaneously energized display the numeral 1.

The selective energization of the display lamps provided in the individual display panels is under the direct control of groups of translating relays individual to the panels. For example, the energization of the display lamps provided in the first-digit panel 103 of the Bill group is under the control of five translating relays R1000, R1010, R1020, R1030 and R1040. The contact wiring of these relays is such that the lamps of the associated panel are energized in different combinations to display different numerical designations when the relays are energized in different combinations of two. Similarly, the lamps included in the second-digit panel 117 of the Present group are arranged to be controlled by the five translating relays R1200, R1210, R1220, R1230 and R1240. The contact wiring of these five relays is identical with the wiring of the relays illustrated in Fig. 10 and provided to control the lamps forming the first-digit panel of the Bill number. Since the translating relay groups provided for controlling the lamps of the panels 104, 105, 106, 109, 110, 113, 114 and 118 are identical in arrangement with those illustrated and provided to control the lamps of the panels 103 and 117, the details thereof have not been shown in the drawings. In order, however, to facilitate a description of the operation of the system as a whole the second, third and last digit relay groups and lamps of the Bill group have been schematically illustrated in Fig. 9 of the drawings. For the same reason the third digit translating relay group and associated display lamps have been schematically illustrated in Fig. 11 of the drawings. Further, the Bill, Present, Aye and Nay indicator lamps 102, 115, 107 and 111, respectively, have been shown in Fig. 12 of the drawings so that the mode of controlling these particular lamps may be described with clarity.

As indicated above, only the lamps 3, 7, 11, 15, 19 and 23, actually required to form the digit 1, are included in each of the first-digit panels 108, 112 and 116. The energization of these lamps as provided in the first-digit panel 116 of the Present group is under the control of two translating relays R1250 and R1260 which, as controlled over the code leads referred to hereinafter, represent the relay combination assigned to the digit 1. Relay groups, each including two relays corresponding to the relays R1250 and R1260, are similarly provided for controlling the lamps forming the first-digit panels 108 and 112 of the Aye and Nay display units.

The group of designation lamps 101 is illustrated in Fig. 6 as comprising nineteen lamps numbered from 611 to 629, inclusive. Each of these lamps corresponds to and indicates the particular action which is to be taken with respect to a particular bill under consideration by the legislative body. For example, energization of the lamp 611 serves to indicate that a Record vote is to be taken with respect to the bill identified by the number displayed by the Bill display unit. Similarly, the lamp 613, when energized, indicates that a roll call vote is to be taken with respect to the bill identified by the displayed Bill number. The various types of actions indicated by the other lamps of this group are identified by the designations appearing immediately above the individual lamps.

For the purpose of controlling the designation lamps 101 and the groups of translating relays individually associated with the lamp panels forming the Bill, Aye, Nay, and Present display units, the master station 125 is equipped with a plurality of keys of the construction conventionally embodied in telephone switchboard equipment. The circuit arrangement of the equipment controlled by these keys is such that a particular Bill number may only be set up in the lamp panels forming the Bill display unit through manual operation of the key equipment. Similarly, the various lamps forming the designation group 101 are only susceptible of direct control from the master station. The lamp panels of the Aye, Nay and Present units, on the other hand, may be either manually controlled from the master station or they may be controlled in a semi-automatic or fully-automatic manner by the vote recorder 300.

More specifically, the equipment provided at the master station 125 comprises a strip of digit keys which are arranged to control the relays of the translating relay groups over the code leads A, B, C, D and E to set up circuits in the networks respectively controlled by these relay groups which correspond to the digits 1 to 9 and 0, respectively. This key strip also includes a blank key 402 and an error key 401. For the purpose of directly controlling the designation lamps 611 to 629, inclusive, correspondingly designated keys 411 to 429, inclusive, are provided at the master station 125. The keys included in the digit, blank and error key strip are all of the well-known non-locking type. The designation keys 411 to 429, on the other hand, are of the well-known locking type such that when any one thereof is operated to its off-normal position, it can only be manually restored to normal. The association of the digit, blank and error keys with the relay equipment individual to the lamp panels of the Bill, Aye, Nay and Present display units is under the control of two set-up keys 430 and 435, both of which are of the locking type. The energization of the display lamps included in the lamp panels of the Bill, Aye, Nay and Present units is under the control of four power supply relays R520, R530, R540 and R550 which individually correspond to the four groups of lamp panels, in the order named. For the purpose of controlling these power supply relays and for the additional purpose of initiating the release of the control equipment individual to the four groups of lamp panels, four display and release keys 440, 443, 446 and 511 are provided, all of which are of the non-locking type. In order to change from strictly manual control of the display board to semi or full automatic control of the board, a transfer key 500 is provided. This key is of the locking type and includes three operating positions. More specifically, when this key occupies its normal position, as shown in the drawings, the accumulation of the data required to set the translating relays individual to the lamp panels of the Aye, Nay and Present display units in accordance with the key operations at the various voting stations, is automatically effected under the control of the recorder 300, but the display of the translated data is effected through the manual operation of the key 513. On the other hand, when the transfer key 500 is operated to one of its off-normal positions to effect disengagement of the contact springs 502 to 508, inclusive, and engagement of the contact springs 501, the setting up of the desired data in the translating relay groups can only be effected through operation of the set-up and digit keys described above. Moreover, with the transfer key 500 in this position the display of the information set up in the translating relay groups can only be effected through manual operation of one or more of the display keys provided at the master station. In order to condition the control equipment for full automatic translation and display of the information registered in the recorder 300, the transfer key 500 is operated to its second off-normal position wherein the contact springs 502 to 508, inclusive, and 510 are engaged and the contact springs 509 are disengaged. The equipment provided at the master station further includes a voting key 363 of the locking type, a vote lock key 362 of the locking type, a release transfer key 513 of the locking type and a manual release key 516 of the non-locking type.

As indicated above, the digit, blank and error keys provided at the master station 125 are utilized to control the translating relay groups individual to the thirteen lamp panels provided at the display board 100. In order operatively to associate the digit key strip in Fig. 4 with the translating relays individually associated with the lamp panels 103 to 106, inclusive, of the Bill group, there is provided a Bill connect relay R800 which is arranged to be controlled by the Bill and Present set-up key 435. Similarly, a Present connect relay R900 is provided for operatively associating the digit key strip with the translating relays individual to the lamp panels 116, 117 and 118 of the Present group. Corresponding connect relays are provided in each of the Aye and Nay control units 121 and 122, respectively. For the purpose of preventing the translating relays individual to the lamp panels of two different groups from simultaneously being associated with the digit key strip, a pair of supervisory relays comprising the Aye and Nay cut-off relay R640 and the Bill and Present cut-off relay R630 are provided. After the digit keys are operatively associated with the translating relays individual to the lamp panels of any one group they are successively connected to the translating relay groups individual to the first, second, third and following digits, if any, in response to successive operations of one or more of the digit keys. To this end, two or more transfer relays are provided in each of the sets of control equipment individual to the four display units. Thus the control equipment individual to the Bill display unit includes a thousands transfer relay R840, a hundreds transfer relay R820, and a tens transfer relay R800. The equipment individual to the Present display unit similarly includes a hundreds transfer relay R930 and a tens transfer relay R940. Corresponding transfer relays are provided in each of the Aye and Nay control units 121 and 122. The four sets of control equipment also individually include release relays, the two relays R810 and R910 being individual to the Bill and Present display units, and corresponding relays being provided in the units 121 and 122.

In order to count the number of Present indications marked in the recorder 300, and to impart corresponding settings to the translating relay groups individual to the lamp panels 116, 117 and 118 at a time when the system is conditioned for automatic or semi-automatic operation, a register is provided which comprises a units counting switch 1110 and a tens counting switch 1120. Similar registers are included in each of the Aye and Nay control units 121 and 122. All of the counting switches are of the well-known rotary type and each thereof comprises four sets of contacts of eleven points each, four wipers individually associated with the contact sets, a motor magnet and a set of off-normal springs. The information transmitted to these counting switches is in the form of current pulses which are relayed to the appropriate units counting switches by pulsing relays. Thus the pulsing relay R1100 is provided for transmitting an impulse to the operating magnet 1115 of the units counting switch 1110, each time a marked contact is engaged by the Present wiper 310 during movement of the traveling carriage 301 embodied in the recorder 300.

For the purpose of automatically controlling the display of information registered in the recorder 300 and of releasing the control equipment after the display is effected, a number of common relays are provided which are illustrated in Fig. 7 of the drawings as comprising a release relay R700, a display control relay R730 and a pulse cut-off relay R720.

In order to supply current to the various lamps, control relays and switch operating magnets a one hundred and ten volt direct current source, not shown, is provided. For convenience in describing the circuits involved the bus wiring to this source has not been shown but it will be understood that the various terminals marked with a plus sign extend to the positive terminal of this source while the various terminals marked with a minus sign extend to the negative terminal of this source. The opposite terminals of this source are also connected to the bus conductors 555 and 556.

MANUAL CONTROL OF ALL DISPLAY UNITS

The utility of arranging the system whereby all of the display units may be manually controlled from the master station 125 in part resides in the fact that the action taken with respect to a particular bill during a previous session may be displayed. For example, a member of the legislative body may ask what disposition was made at a previous session with respect to the amendment of bill No. 7,421. The master station operator upon receiving this request may by consulting available records ascertain that the bill was passed by a Record vote of 125 to 17, at a time when 298 members of the legislative body were present. After obtaining this information the master station operator may proceed to set up the information on the display board 100.

*Setting up the designation lamps*

In order to indicate the character of the action taken with respect to the bill the operator actuates the two designation keys 411 and 422 to their respective off-normal positions, thereby to complete obvious circuits for energizing the designation lamps 611 and 622. The resulting illumination of these two lamps serves to indicate that a Record vote was taken with respect to an amendment relating to the bill in question. It will be understood that the designation keys 411 to 429, inclusive, respectively control the designation lamps 611 to 629, inclusive, and accordingly that operation of any one of the enumerated keys serves to cause the energization of the corresponding lamp.

*Setting up the Bill number*

In order to display the number of the bill, namely, 7,421, the master station operator first operates the set-up key 435 to the Bill set-up position, wherein the contacts 436 and 438 are respectively engaged, and then operates the digit keys 7, 4, 2 and 1 in sequence and in the order named. In this regard it will be recalled from the preceding explanation that when the display board is being controlled in a wholly manual manner the transfer key 500 is maintained in its manual operating position, wherein the contacts 501 are engaged and the contacts 502 to 508, inclusive, are respectively disengaged. When the set-up key 435 is operated to the Bill set-up position a circuit is completed for energizing the Aye and Nay cut-off relay R640, this circuit extending from the positive terminal of the current source by way of the contacts 631, C452, the contacts 436, C454, the contacts 663 and the winding of R640 to the negative terminal of the current source. At the contacts 438, a circuit is completed for energizing the Bill connect relay R800, this circuit extending from the positive terminal of the current source by way of the contacts 631, C452, the contacts 438, C451 and the winding of R800 to the negative terminal of the current source. The relay R640, upon operating, opens its contacts 642 to prevent the energization of the Bill and Present cut-off relay R630 until such time as the set-up key 435 is restored to its normal position. At its contacts 641, the relay R640 opens a point in the common portion of the operating circuits for the Aye and Nay connect relays provided in the control units 121 and 122. The Bill connect relay R800, in operating, closes its contacts 806 to prepare one of the operating circuits for the Bill release relay R810. At its contacts 801 to 805, inclusive, the relay R800 extends the code leads A, B, C, D and E to the terminals of the translating relays R1000, R1010, R1020, R1030 and R1040, preparatory to the registration of the first digit in this translating relay group.

Following the operation of the two relays R640 and R800 the digit keys 7, 4, 2 and 1 may be successively operated to register the corresponding digits in the translating relay groups associated with the lamp panels 103, 104, 105 and 106. When the digit key 7 is momentarily depressed the positive terminal of the current source is connected through the contacts 409 and 410 to the code leads D and E, respectively, thereby to energize the translating relays R1030 and R1040. More specifically, the operating circuit for the relay R1030 extends from the positive terminal of the current source by way of the contacts 409, the lead D, the contacts 804, 827 and 847, C854, and the winding of R1030 to the negative terminal of the current source. Similarly, the operating circuit for the relay R1040 extends from the positive terminal of the current source by way of the contacts 410, the code lead E, the contacts 805, 829 and 849, C855, and the winding of R1040 to the negative terminal of the current source. When thus energized the two relays R1030 and R1040 both operate and close their contacts 1031 and 1041 to complete a path including the conductor C867 and the contacts 811 for short-circuiting the thousands transfer relay R840. This short-circuiting path is interrupted at the contacts 409 and 410 when the digit key 7 is released, thus permitting the transfer relay R840 to be energized in series with the two parallel-connected translating relays R1030 and R1040 over a circuit which extends from the negative terminal of the current source by way of the windings of R1030 and R1040 in parallel, the contacts 1041 and 1031 in multiple, C867, the winding or R840 and the contacts 811 to the positive terminal of the current source. The energization of the relays R1030 and R1040 over this locking circuit serves to maintain these two relays in their respective operated positions. The transfer relay R840 operates when the circuit just traced is completed. In operating, the relay R840 opens its contacts 841, 843, 845, 847 and 849 to disconnect the code leads A to E, inclusive, from the translating relays R1000, R1010, R1020, R1030 and R1040 associated with the lamp panel 103, and closes its contacts 842, 844, 846, 848 and 849' to connect the code leads to the terminals of the translating relays forming the group individual to the lamp panel 104. Thus a transfer action is effected, whereby the second digit may be registered in the last-mentioned translating relay group.

When the second digit key 4 is depressed by the operator, the positive terminal of the current source is connected through the contacts 407 and 408 to the code leads A and B, so that the first and second translating relays of the group associated with the lamp panel 104 are energized. These two relays, in operating, complete a path including the conductor C851' and the contacts 811, for short-circuiting the hundreds transfer relay R820. Thereafter, and when the digit key 4 is released, the short-circuiting path is interrupted at the contacts 407 and 408 so that the hundreds transfer relay R820 is energized in series with the parallel-connected first and second relays of the group associated with the lamp panel 104. The manner in which this is accomplished will be clearly apparent from the above explanation with reference to the operation of the thousands transfer relay R840. The transfer relay R820, upon operating, opens its contacts 821, 823, 825, 827 and 829 to disconnect the code leads A to E, inclusive, from the five translating relays of the group associated with the lamp panel 104, and closes its contacts 822, 824, 826, 828 and 829' to connect the code leads to the terminals of the translating relays in the group associated with the third digit panel 105.

When the digit key 2 is momentarily operated, the contacts 405 and 406 are closed to connect the positive terminal of the current source to the code leads A and D, whereby the first and fourth translating relays of the group individual to the lamp panel 105 are energized and operate to short-circuit the tens transfer relay R830 over a path including the conductor C852' and the contacts 811. When the digit key 2 is released the contacts 405 and 406 are disengaged to open this short-circuiting path, permitting the tens transfer relay R830 to be locked up in series with the parallel-connected first and fourth translating relays of the last-mentioned group. In operating, the tens transfer relay R830 opens its contacts 834, 836, 838, 838' and 839' to disconnect the code leads A to E, inclusive, from the translating relays of the group individual to the lamp panel 105, and closes its contacts 833, 835, 837, 837' and 839 to connect the code leads to the translating relays in the group individual to the last digit lamp panel 106. At its contacts 832, the relay R830 completes an obvious path for impressing the positive potential of the current source upon the hold lead C853', thereby to prepare holding circuits for the translating relays of the group individual to the lamp panel 106.

When the digit key 1 is momentarily depressed the contacts 403 and 404 are engaged to connect the positive terminal of the current source to the code leads A and E, whereby the first and fifth translating relays of the group individual to the lamp panel 106 are energized. These two relays, in operating, lock in a circuit including the hold lead C853' and the contacts 832. Following the release of the digit 1 key, the Bill number 7,421 is fully set up in the four translating relay groups provided to receive and register the digit values of the four digits included in this number.

In order to complete the explanation regarding the operation of the control keys located at the master station 125, it is pointed out that the blank key 402 is provided for setting up a blank registration in any desired translating relay group. For example, if the Bill number comprises less than four digits, it is necessary to set up a blank registration in the translating relay group individual to the first-digit lamp panel 103, in order that the code leads may be transferred to the translating relay group individual to the second-digit lamp panel 104. In such case the blank key 402 is the first digit key depressed, this key when operated serving to connect the positive terminal of the current source to the code lead E, whereby the fifth translating relay R1040 of the group individual to the first-digit panel 103 is energized. This relay is locked up in series with the thousands transfer relay R840 when the key 402 is subsequently released. As explained more fully hereinafter, with the relay R1040 alone operated, the circuits for energizing the lamps of the panel 103 are all held open during the display interval and, accordingly, no number is displayed in this panel. In a similar manner the blank key 402 may be utilized for making blank registrations in the translating relay groups individual to the second, or the second and third, lamp panels of the Bill display unit, thus permitting the desired transfer operations to be effected without setting up numbers for display in these panels.

The error key 401, as its name implies, is provided for nullifying a registration erroneously made in one of the translating relay groups. For example, if the number 8 is inadvertently set up in the translating relay group individual to the lamp panel 103, instead of the number 7, the two operated relays of this group may be released by momentary actuation of the error key 401. When this key is operated the contacts thereof are closed to complete the prepared operating circuit for the Bill release relay R810, this circuit extending from the positive terminal of the current source through the contacts of the key 401 by way of the error lead C450, the contacts 806 and the winding of R810 to the negative terminal of the current source. In operating, the relay R810 opens its contacts 811 to interrupt the circuit over which the thousandths transfer relay R840 is being held energized in series with two of the translating relays in the group individual to the lamp panel 103. The two translating relays, in releasing, further interrupt their respective locking circuits which commonly include the winding of the transfer relay R840. Hence when the error key is subsequently released to cause the deenergization and restoration of the Bill release relay R810, the transfer relay R840 and the two translating relays are not re-operated. It will be understood from this explanation that if an error occurs in setting up the second, third or fourth digit of the Bill number, and the error key 401 is operated to cause the operation of the release relay R810, the registrations in all of the translating relay groups will be wiped out due to the deenergization and release of all operated translating and transfer relays. In such case the entire Bill number must be again set up.

*Displaying the Bill number*

After the Bill number is set up in the manner just explained, the master station operator may display the same by momentarily operating the display key 443 to the Bill display position. In response to this operation the contacts 444 are closed to complete a circuit for energizing the Bill display power relay R520, this circuit extending from the positive terminal of the current source by way of the contacts 444, C463 and the winding of R520 to the negative terminal of the current source. In operating, the relay R520 closes its contacts 521 to complete a holding circuit for itself, this holding circuit extending from the positive terminal of the current source by way of the contacts 811, C575, the contacts 521, and the winding of R520 to the negative terminal of the current source. At its contacts 522 and 523, the relay R520 connects the Bill display leads C573 and C574 to opposite terminals of the current source, thereby to complete the prepared circuits for energizing the lamps of the panels 103, 104, 105 and 106 which, in combination, serve to display the digits 7, 4, 2 and 1, in these panels, respectively. More specifically, the lamps selected for energization in the enumerated lamp panels are determined by the particular pair of the associated translating relays which are operated. Thus, with the fourth and fifth translating relays R1030 and R1040 of the group individual to the lamp panel 103 operated, the lamps 1, 2, 3, 4, 8, 11, 14, 17 and 21 are energized in this panel. The negative side of the circuit for energizing these lamps extends from the negative terminal of the current source by way of the contacts 522 and C574 to the lamp terminal multiple extending between the terminals of the lamps 1 to 23 in the panel 103. The positive side of this circuit extends from the positive terminal of the current source by way of the contacts 523 and C573 to various contacts controlled by the translating relays R1000, R1010, R1020, R1030 and R1040. From the conductor C573 the circuits for energizing the lamps 1, 2, 3, 4, 8, 11, 14, 17 and 21 are completed through the closed lower contacts of the relays R1030 and R1040, as will be readily apparent from an inspection of the wiring arrangement of the contacts controlled by these relays. By reference to the lamp layout of the panel 103, as illustrated in Fig. 13 of the drawings, it will be noted that when the enumerated lamps of this panel are energized the numeral 7 is outlined thereby. In a similar manner the lamps required to display the digits 4, 2 and 1, respectively, are energized in the lamp panels 104, 105 and 106. More generally considered, the lamp combinations which must be energized to display the digits 1 to 9 and 0, respectively, are shown by the chart illustrated in Fig. 14 of the drawings. This chart also discloses the relationship between the various code leads and the translating relays of the several identical translating relay groups. This chart is self-apparent when considered in conjunction with either of the two translating relay groups illustrated in Figs. 10 and 12 of the drawings and the lamp layout for the individual panels as illustrated in Fig. 13 of the drawings. It will be understood that following the operations just described, the Bill number 7421 is displayed by the lamp panels forming the Bill display unit. In addition, a circuit including the two Bill display leads C573 and C574 is completed for energizing the identification lamp 102, thus indicating that the number displayed on the board 100 designates the Bill number.

*Setting up the Present vote total*

In order to set up the number, namely 156, indicative of the number of non-voting members of the legislature present at the time the action was taken with respect to the bill, the master station operator transfers the set-up key 435 from its Bill set-up position to its Present set-up position, wherein the contacts 436 and 438 are respectively disengaged and the contacts 437 and 439 are respectively engaged. When the contacts 438 are opened, the previously traced operating circuit for the Bill connect relay R800 is interrupted, causing this relay to restore and disconnect the code leads A to E, inclusive, from the relay equipment associated with the Bill display unit. At its contacts 806, the relay R800, in restoring, opens the above-traced circuit for energizing the Bill release relay R810. When the contacts 436 are disengaged, the above-traced operating circuit for the Aye and Nay cut-off relay R840 is opened, but the closure of the contacts 437 results in the immediate recompletion of this circuit. At the contacts 439, a circuit is completed for energizing the Present connect relay R900, this circuit extending from the positive terminal of the current source by way of the contacts 501, C458, the contacts 832, C453, the contacts 439, C466 and the winding of R900 to the negative terminal of the current source. When thus energized, the relay R900 operates and closes its contacts 931 and 935 to connect the code leads A and E to the terminals of the translating relays R1250 and R1260. At its contacts 936, the relay R900 prepares a circuit whereby the Present release relay R910 may be directly controlled over the error lead C450 by the error key 401.

Following the operation of the connect relay R900, the digit keys 1, 5 and 6 may be successively operated in the order named to set up the corresponding digits in the translating relay groups individual to the first, second and third digit lamp panels 116, 117 and 118 of the Present display unit. More specifically, when the digit key 1 is momentarily operated, the positive terminal of the current source is connected through the contacts 403 and 404 to the code leads A and E, to complete circuits for energizing the relays R1250 and R1260. The circuit for energizing the relay R1250 may be traced as extending from the code lead A by way of the contacts 901 and 931, C951 and the winding of R1250 to the negative terminal of the current source. Similarly, the operating circuit for the relay R1260 may be traced as extending from the code lead E by way of the contacts 905 and 938, C952 and the winding of R1260 to the negative terminal of the current source. These two relays, in operating, close their contacts 1251 and 1261, respectively, to complete multiple paths for short-circuiting the upper winding of the hundreds transfer relay R930. At their remaining contacts the two relays R1250 and R1260 prepare circuits for energizing the lamps 3, 7, 11, 15, 19 and 23 of the lamp panel 116, the energization of these lamps being required to display the digit 1. Following the operation of these two relays, and when the digit 1 key is released, the path short-circuiting the upper winding of the transfer relay R930 is interrupted at the contacts 403 and 404. In response to this operation the upper winding of the relay R930 is energized in series with the parallel-connected windings of the two relays R1250 and R1260, over a circuit which extends from the positive terminal of the current source by way of the contacts 911, the upper winding of R930, C950, the contacts 1251 and 1261, and the parallel-connected windings of R1250 and R1260 to the negative terminal of the current source. The current traversing the two branches of this circuit serves to maintain the two relays R1250 and R1260 operated and to cause the operation of the transfer relay R930. In operating, the relay R930 opens its contacts 931 and 938 to interrupt the above-traced operating circuits for the translating relays R1250 and R1260, and closes its contacts 932, 934, 936, 937' and 939' to connect the code leads A to E, inclusive, to the terminals of the translating relays forming the group individual to the lamp panel 117. At its contacts 939, the relay R930 completes a locking circuit for itself, this circuit extending from the positive terminal of the current source by way of the contacts 911 and 939 and the lower winding of R930 to the negative terminal of the current source. At its contacts 933, 935 and 937, the relay R930 opens certain alternative operating circuits for itself.

In this regard it is pointed out that if any digit key other than the digit 1 key is the first key depressed following the operation of the set-up key 435 to the Present set-up position, the transfer relay R930 is immediately energized. Thus, if the digit 3 key, for example, is the first digit key actuated, the lower winding of the transfer relay R930 is immediately energized over a circuit having three parallel branches, one of which extends from the positive terminal of the current source by way of the contacts 481, the code lead B, the contacts 902 and 933 and the lower winding of R930 to the negative terminal of the current source. A second branch of this circuit, which is also completed, extends from the positive terminal of the current source by way of the contacts 482, the code lead D, the contacts 904 and 937 and the lower winding of R930 to the negative terminal of the current source. It will be noted that, in this case, neither of the two translating relays R1250 and R1260 are energized. When thus energized, the transfer relay R930 immediately operates and extends the five code leads A, B, C, D and E to the terminals of the five translating relays in the group individual to the lamp panel 117, so that the second and fourth relays, R1210 and R1230 of this group, are immediately energized in the exact manner set forth below. In operating, the relay R930 also completes the above-traced holding circuit for itself, so that the energization thereof is maintained after the digit 3 key is released. In this case the tens transfer relay R940 is energized in series with the two translating relays R1210 and R1230 when the digit 3 key is released, in the manner pointed out below. In the event a digit key utilizing only one of the A and E code leads in combination with one of the B, C and D code leads is the first key depressed following operation of the set-up key 435 to its Present set-up position, the lower winding of the transfer relay R930 and one of the two translating relays R1250 and R1260 are concurrently energized. In such case, the energized one of the two translating relays operates and locks up in series with the upper winding of the transfer relay R930. Simultaneously, the transfer relay R930 operates to extend the five code leads to the terminals of the translating relays forming the group individual to the lamp panel 117. Thus, one of the two translating relays R1250 and R1260 remains operated until the equipment is released. It will be noted, however, that energization of both of these relays is required if the lamps of the panel 116 are to be energized.

Following the operation of the transfer relay R930 in the manner first described above, the digit 5 may be set up in the translating relay group individual to the lamp panel 117 through momentary operation of the digit 5 key by the master station operator. More specifically, when this key is moved to its off-normal position, a circuit including the contacts 483, the code lead B, the contacts 902, 934, 943 and C954 is completed for energizing the second translating relay R1210. Another circuit, including the contacts 484, the code lead E, the contacts 905, 938' and 947 and C957 is completed for energizing the fifth translating relay R1240. These two relays, in operating, close their contacts 1211 and 1241 to complete multiple paths for short-circuiting the winding of the tens transfer relay R940. These paths are interrupted at the contacts 483 and 484 when the digit 5 key is released, thus permitting the tens transfer relay R940 to be energized in series with the parallel-connected relays R1210 and R1240 over a circuit which extends from the positive terminal of the current source by way of the contacts 911, the winding of R940, C958, the contacts 1211 and 1241, and the parallel-connected windings of R1210 and R1240 to the negative terminal of the current source. When thus energized, the tens transfer relay R940 operates and opens its contacts 941, 943, 945, 946 and 947 to disconnect the five code leads A to E, inclusive, from the terminals of the five translating relays R1200, R1210, R1220, R1230 and R1240. At its contacts 942, 944, 945', 946' and 947', the relay R940 connects the five code leads to the translating relays forming the group individual to the lamp panel 118. At its contacts 948, the relay R940 prepares the common portion of the holding circuits for the five translating relays in the last-mentioned group.

Following the operation of the tens transfer relay R940, the third digit 6 may be set up in the translating relay group individual to the lamp panel 118 by operating the digit key 6 to impress the positive potential of the current source upon the code leads A and C. The first and third translating relays of this group are energized when the indicated code leads are connected to the positive terminal of the current source. These two relays, in operating, lock in a circuit including the hold lead C964, and the contacts 948 and 911.

*Displaying the Present vote total*

After the three digits have been set up in the translating relays of the groups individual to the lamp panels 116, 117 and 118 in the manner just explained, the numbers registered in these groups may be displayed by momentarily actuating the key 440 to its Present display position, wherein the contacts 441 are engaged. When these contacts are moved into engagement, a circuit is completed for energizing the Present display power relay R530, this circuit extending from the positive terminal of the current source by way of the contacts 501, C458, the contacts 632, C453, the contacts 441, C464 and the winding of R530 to the negative terminal of the current source. In operating, the relay R530 closes its contacts 531 to complete a locking circuit for itself, this circuit extending from the positive terminal of the current source by way of the contacts 911, C578, the contacts 531, and the winding of R530 to the negative terminal of the current source. At its contacts 532 and 533, the relay R530 completes circuits commonly including the Present display leads C576 and C577 for energizing the lamps required to display the digits 1, 5 and 6 in the lamp panels 116, 117 and 118, respectively. The identification lamp 115 is also energized over the leads C576 and C577 to indicate that the number displayed by the panels 116, 117 and 118 constitutes the number of legislators present, but not voting, at the time the action was taken with respect to the bill. It will be noted that the lamps 3, 7, 11, 15, 19 and 23 in the panel 116 are energized over circuits including the series-connected contacts of the two translating relays R1250 and R1260. By reference to the chart illustrated in Fig. 14 of the drawings, and a comparison of this chart with the circuit connections of the contacts controlled by the translating relays illustrated in Fig. 12 of the drawings, the lamps energized in the panels 117 and 118 may readily be ascertained.

*Setting up and displaying the Aye and Nay vote totals*

The manner in which the numbers, representing respectively the Aye and Nay vote totals with respect to the bill in question, are set up in the appropriate translating relay groups and then displayed, is substantially similar to that described above with reference to the setting up and displaying of the Present vote total. In this regard it is pointed out that in order to associate the digit keys with the relay equipment provided to control the lamp panels 108, 109 and 110 in the Aye display unit the set-up key 435 is first restored to normal, following which the set-up key 430 is operated to its Aye set-up position. When the set-up key 435 is restored to normal the Aye and Nay cut-off relay R640 and the Present connect relay R900 are deenergized and restored. In releasing, the relay R900 opens its contacts 901 to 906, inclusive, to disconnect the five code leads and the error lead C450 from the relay equipment associated with the lamp panels forming the Present display unit. The relay R640, in restoring, closes its contacts 642 to prepare the operating circuit for the Bill and Present cut-off relay R630, and closes its contacts 641 to prepare the operating circuits for the connect relays and the display power relays individual to the Aye and Nay control units. When the set-up key 430 is operated to its Aye set-up position, the contacts 433 are engaged to complete a circuit for energizing the connect relay, not shown, individual to the Aye relay group and included in the control unit 121. At the contacts 431 a circuit is completed for energizing the Bill and Present cutoff relay R630, this circuit extending from the positive terminal of the current source by way of the contacts 501, C458, the contacts 641, C456, the contacts 431, C455, the winding of R630 and the contacts 642 to the negative terminal of the current source. When thus energized the relay R630 opens its contacts 631 further to interrupt the above-traced operating circuit for the Bill connect relay R800. At its contacts 632, the relay R630 opens another point in the operating circuit for the Present connect relay R900. At its contacts 633, the relay R630 opens a point in the above-traced operating circuit for the Aye and Nay cut-off relay R640.

The above-mentioned operating circuit for the Aye connect relay may be traced as extending from the positive terminal of the current source by way of the contacts 501, C458, the contacts 641, C456, the contacts 433, C461, and the winding of the Aye connect relay, not shown, to the negative terminal of the current source. Following the operation of this relay the digit keys may be manipulated in the manner explained above, to set up the digits 1, 2 and 5 in the translating relay groups associated with the lamp panels 108, 109, and 110, respectively. After these digits are set up the key 511 may be operated to its display position to complete a circuit for energizing the Aye display power relay R540, this circuit extending from the positive terminal of the current source by way of the contacts 501, C548, the contacts 641, C456, the contacts 512, and the winding of R540 to the negative terminal of the current source. When thus energized the relay R540 closes its contacts 541 to complete a locking circuit for itself which includes the locking lead C581. At its contacts 542 and 543, the relay R540 connects the Aye display leads C579 and C580 to the terminals of the current source, whereby the lamps of the display panels 108, 109 and 110, which are required to display the number 125, are energized. When the indicated display leads are connected to the current source the identification lamp 107 is also energized thereover to indicate the significance of the number displayed by the panels 108, 109 and 110.

In order to set up the Nay vote total in the control unit 122, the operator actuates the set-up key 430 from its Aye set-up position to its Nay set-up position. In response to this operation the Aye connect relay included in the unit 121 is deenergized and restores; a circuit is completed for energizing the Nay connect relay included in the unit 122; and the circuit for energizing the Bill and Present cut-off relay R630 is rearranged to include the contacts 434 in lieu of the contacts 433, so that the energization of the indicated cut-off relay is maintained. The Aye connect relay, in releasing, disconnects the code and error leads from the relays provided in the control unit 121. The Nay connect relay, in operating, connects these leads to the relays provided in the control unit 122 for controlling the lamp panels 112, 113 and 114. More specifically, the operating circuit for the Nay connect relay may be traced as extending from the positive terminal of the current source by way of the contacts 501, C458, the contacts 641, C456, the contacts 434, C462 and the winding of the Nay connect relay, not shown, to the negative terminal of the current source. Following the operation of this relay the digit keys may be actuated to set up the digits 1 and 7 in the translating relay groups individual to the second and third lamp panels 113 and 114, respectively. It is noted in this regard that one but not both of the translating relays individual to the first digit lamp panel 112 may be energized, since the digit 1 is not to be displayed in this panel.

After the digits designating the Nay vote total have been set up in the appropriate translating relay groups of the control unit 122, the number represented thereby may be displayed on the board 100 by operating the key 446 to its display position, wherein the contacts 447 are engaged. When these contacts are moved into engagement a circuit is completed for energizing the Nay display power relay R550, this circuit extending from the positive terminal of the current source by way of the contacts 501, C458, the contacts 641, C456, the contacts 447, C465, and the winding of R550 to the negative terminal of the current source. In operating, the relay R550 closes its contacts 551 to complete a holding circuit for itself which includes the Nay display locking lead C584, this lead being connected to the positive terminal of the current source through the operated make contacts controlled by the tens transfer relay provided in the unit 122. At its contacts 552 and 553, the relay R550 connects the Nay display leads C582 and C583 to opposite terminals of the current source, thereby to complete the prepared circuits for energizing the lamps of the display panels 113 and 114 which are required to display the digits 1 and 7, respectively. The connection of the display leads C582 and C583 to the terminals of the current source also results in the energization of the identification lamp 111, whereby the significance of the number displayed by the panels 113 and 114 is indicated on the display board 100.

From the above description of the circuits involved, it will be apparent that no particular order need be followed in setting up the various numbers on the display board. Thus the set-up keys 430 and 435 may be controlled to operate the four connect relays in any desired sequence. With any one of these connect relays operated, the digit keys are connected to the translating relays associated with the operated connect relay and the other translating relay groups are positively locked out. It will also be understood that the keys provided at the master station may be controlled to set up only partial information with respect to any particular bill. Thus the control equipment associated with each of the four groups of display panels is controllable independently of the equipment associated with the other groups of lamp panels.

*Releasing the display units*

In order to release the relay equipment provided to control the lamp panels 103, 104, 105 and 106, forming the Bill display unit, the key 443 is momentarily operated to its release position wherein the contacts 445 are engaged to complete a circuit for energizing the Bill release relay R810. This circuit extends from the positive terminal of the current source by way of the contacts 445, C457 and the winding of R810 to the negative terminal of the current source. In operating, the relay R810 opens its contacts 811, thereby to interrupt the previously traced locking circuits for the transfer relays, the display relay R520 and the operated translating relays associated with the lamp panels 103 to 106, inclusive. In the case under consideration the relays R820, R830, R840, R1030 and R1040, and two translating relays in each of the groups individual to the second, third and fourth lamp panels 104, 105 and 106, are deenergized and restore in response to the operation of the relay R810. The various translating relays, in releasing, further interrupt the locking circuits which extend through the windings of the associated transfer relays. Accordingly, all of the enumerated translating and transfer relays remain in their restored positions when the Bill release relay R810 restores in response to the release of the key 443 by the master station operator. The relay R520, in releasing, opens its contacts 522 and 523 to disconnect the display leads C573 and C574 from the terminals of the current source, thereby to deenergize the identification lamp 102 and further to interrupt the circuits for energizing the lamps provided in the panels 103 to 106, inclusive. At its contacts 521, the relay R520, in restoring, further opens its own locking circuit. Following the release of this relay the relay equipment provided to control the lamp panels of the Bill display unit is fully restored to normal.

In order to release the relay equipment provided to control the lamp panels 116, 117 and 118, the key 440 is momentarily operated to its release position, wherein the contacts 442 are engaged to complete a circuit for energizing the slow-to-release Present release relay R910. This circuit extends from the positive terminal of the current source by way of the contacts 501, C458, the contacts 442, C459, and the winding of R910 to the negative terminal of the current source. In operating, the relay R910 opens its contacts 911 to interrupt the previously traced locking circuits for the display relay R530, and the translating and transfer relays provided to control the lamp panels 116, 117 and 118. The translating relays, in restoring, further interrupt their own locking circuits. Accordingly, the transfer and translating relays are not again energized when the relay R910 subsequently restores in response to the release of the key 440 by the master station operator. The display relay R530, in releasing, opens its contacts 532 and 533 to disconnect the Present display leads C576 and C577 from the terminals of the current source. Thus the identification lamp 115 is deenergized and additional points are opened in the circuits for energizing the lamps of the panels 116, 117 and 118. In releasing, the relay R530 also opens its contacts 531, further to interrupt its own locking circuit.

The manner in which the relay equipment provided in the Aye and Nay control units 121 and 122 is released is substantially similar to that just described with reference to release of the relay equipment associated with the Present lamp panels. Thus, when the key 511 is momentarily operated to its release position the contacts 513 are closed to complete a circuit for energizing the Aye release relay provided in the unit 121, this circuit extending from the positive terminal of the current source by way of the contacts 501 and 513, C560, and the winding of the Aye release relay, not shown, to the negative terminal of the current source. When this release relay operates, all of the associated operated relays are deenergized and restore and the illuminated lamps of the lamp panels 108, 109 and 110 are deenergized. The display relay R540, upon restoring, disconnects the Aye display leads C579 and C580 from the terminals of the current source so that the Aye identification lamp 107 is deenergized. In releasing, the relay R540 also opens its contacts 541 further to interrupt its own locking circuit.

The deenergization of the illuminated lamps in the panels 112, 113 and 114 forming the Nay display unit and the release of the associated relay equipment is under the control of the key 446. More specifically, when this key is momentarily operated to its release position the contacts 448 are closed to complete a circuit for energizing the Nay release relay included in the unit 122. This circuit may be traced as extending from the positive terminal of the current source by way of the contacts 501, C458, the contacts 448, C460, and the winding of the Nay release relay, not shown, to the negative terminal of the current source. When the Nay release relay operates, all of the operated relays in the control unit 122 are deenergized and restore, so that the illuminated lamps included in the panels 112, 113 and 114 are deenergized. When the release relay operates, the locking circuit for the Nay display power relay R550 is interrupted in a manner clearly apparent from the preceding explanation. In restoring, the relay R550 opens its contacts 551 further to interrupt its locking circuit and opens its contacts 552 and 553 to disconnect the Nay display leads C582 and C583 from the terminals of the current source thereby to deenergize the Nay identification lamp 111 and further to interrupt the circuits for energizing the lamps provided in the panels 112 to 114, inclusive.

From the above explanation it will be understood that the keys 440, 443, 446 and 511 are independently controllable by the master station operator to wipe out any desired portion of a display, while retaining the remaining portion. Thus the operator may wipe out the Present display while retaining the display of the Bill number and the Aye and Nay vote totals with respect to the particular action taken on the Bill. Similarly, the Aye display may be wiped out while retaining all other portions of the display. Thus the flexibility of the apparatus for manually controlling the various display units is readily apparent.

AUTOMATIC SET-UP OF THE PRESENT, AYE, AND NAY VOTE TOTALS

In order to condition the system for semi-automatic operation wherein the Aye, Nay and Present votes are, in taking action with respect to a particular bill, automatically counted, the transfer key 500 is operated to the normal position illustrated in the drawings. It will be observed that when this key is restored to normal the contacts 501 are disengaged to open the common portion of the circuits controlled by the set-up key 436 and the combined display and release keys 440, 446 and 511. At these contacts, a point is also opened in the circuit controlled by the set-up key 435 for energizing the Present connect relay R900. Thus the translating relays forming the groups individual to the lamp panels of the Present, Aye and Nay display units are positively locked out, so that they cannot be controlled by the digit keys provided at the master station 125. Moreover, the display power relays R530, R540 and R550 are rendered non-controllable by the display and release keys 440, 446 and 511. At the contacts 505, a circuit is completed for energizing the relay R920, this circuit extending from the positive terminal of the current source by way of the contacts 505, C568, and the winding of R920 to the negative terminal of the current source. When thus energized the relay R920 closes its contacts 921 to prepare a circuit for energizing the translating relays R1250 and R1260 in parallel. At its contacts 922 and 923, the relay R920 similarly prepares circuits for energizing in parallel the translating relays individual to the first digit lamp panels 108 and 112 of the Aye and Nay display units, respectively.

With the transfer key 500 occupying its normal position, as shown in the drawings, if a vote is called for with respect to a particular bill, the number of which may be displayed upon the board 100 in the manner explained above, each legislator may cast his vote by operating one of the keys provided at his station. Before the voting is started the master station operator actuates the key 363 to its off-normal position wherein an obvious circuit is completed for energizing the voting relay R350. This relay, in operating, locks up in a circuit including the contacts 351 and 361, and closes its contacts 352 to connect the common conductor C367 to the positive terminal of the current source. Following the operation of this relay each vote cast at one of the voting stations is registered in the recorder 300. Thus if the legislator attending the voting station 210 desires to cast an Aye vote with respect to the bill in question, he will first operate the key 216 to its off-normal position wherein the contacts 219 are engaged, and then momentarily actuate the Aye key 213 to its off-normal position to complete a circuit for energizing the Aye relay R230. This circuit extends from the positive terminal of the current source by way of the contacts 352 and 331, C364, the contacts 219, the contacts of the Aye key 213, the contacts 222 and 243, and the winding of R230 to the negative terminal of the current source. In operating, the relay R230 locks up in a circuit which extends from the positive terminal of the current source by way of the contacts 352 and 331, C364, the contacts 217, 287 and 231, and the winding of R230 to the negative terminal of the current source. At its contacts 232, the relay R230 opens a point in the operating circuit for the Present voting relay R220. At its contacts 233, the relay R230 opens a point in the operating circuit for the Nay voting relay R240. At its contacts 234, the relay R230 opens a point in the path for impressing positive potential upon the non-voting marking lead C368 individual to the station 210. At its contacts 235, the relay R230 connects the Aye marking lead C370 to the positive terminal of the current source over a path including the common conductor C367 and the contacts 352. In a manner similar to that just described the legislator at the voting station 210 may cast a Nay vote, in which case the Nay relay R240 is locked up in a circuit clearly apparent from the above explanation. In operating the relay R240 opens the operating circuits for the Present and Aye relays, opens the non-voting marking path, and connects the Nay marking lead C371 to the positive terminal of the current source. On the other hand, the legislator may be desired to register his presence but to withhold his vote with respect to the particular measure under consideration. In such case the Present key 214 is momentarily actuated to its off-normal position after the lock key 216 has been operated to its off-normal position. The Present voting relay R220 is thus energized and locks up in a circuit including its locking contacts 221. At its contacts 222 and 223, the relay R220 opens the respective operating circuits for the Aye and Nay voting relays R230 and R240. At its contacts 224, the relay R220 opens a point in the marking path including the non-voting marking lead C368. At its contacts 225, the relay R220 connects the Present marking lead C369 to the positive terminal of the current source. If an error is made by the legislator in casting his vote it may be rectified through momentary operation of the error key 215 to open the common portion of the locking circuits for the voting relays R220, R230 and R240, causing the energized one of these relays to restore. Following the release of this relay the proper vote may be registered through operation of one of the Nay, Aye and Present keys 212, 213 and 214, in the manner just explained. After the proper vote has been registered by the legislator, he may restore the locking key 216 to its normal position, wherein the contacts 219 are opened further to interrupt the above-traced operating circuits for the voting relays R220, R230 and R240. In this regard it is pointed out that the locking key 216 is provided for the purpose of enabling a legislator to cast his vote at any time without waiting for the voting request. For example, the legislator may have reached a decision as to his vote and may not wish to listen to the discussion of the bill under consideration. In such case he may actuate the locking key 216 to its off-normal position, actuate the desired one of the Aye, Nay and Present keys to its off-normal position, and leave the two operated keys in their off-normal positions, so that when the master voting key 363 is subsequently operated by the master station operator the appropriate one of the register relays R220, R230, and R240 will be energized and operate. Thus after a legislator has actuated his key set in the desired manner, the key set is left undisturbed in the voting position selected and the corresponding vote will be accounted for when the votes are subsequently counted and recorded.

The equipment individual to each of the other voting stations may be set in accordance with the wishes of the legislators attending these positions in a manner similar to that just explained. Thus the Aye, Nay and Present voting relays R260, R250 and R270, individual to the voting station 201, are individually controllable by the Aye, Nay and Present keys 203, 202 and 204, respectively, and function to control the Aye, Nay, Present and non-voting marking paths in accordance with the setting of these keys. The circuits and marking paths individual to these three relays are substantially identical with those associated with the three relays provided at the voting station 210, and the mode of controlling the same will be clearly apparent from the above explanation.

After the voting period is ended the votes may be automatically totaled and recorded under the control of the master station operator. To this end the vote lock key 362 is first operated to its off-normal position, after which the master switch 373 is closed to initiate the operation of the recorder 300. When the vote lock key 362 is moved off normal, an obvious circuit is completed for energizing the relay R340. This relay, in operating, closes its contacts 342 to complete a circuit including the contacts 352 and the conductor C366 for energizing the group lock relay R290 and the other group lock relays in parallel. At its contacts 341, the relay R340 completes an obvious circuit for energizing the slow-to-operate control relay R335. The relay R290, upon operating, closes its contacts 291 to 297, inclusive, to complete alternative locking circuits for the operated voting relays individual to the various voting stations. This circuit as provided for the Aye voting relay R230 may be traced as extending from the positive terminal of the current source by way of the contacts 352, C367, the contacts 297 and 231, and the winding of R230 to the negative terminal of the current source. A similar locking circuit for the Nay relay R270 may be traced as extending from the positive terminal of the current source by way of the contacts 352, C367, the contacts 291 and 271, and the winding of R270 to the negative terminal of the current source. Thus the group relay R290, in operating, completes auxiliary locking circuits for the operated voting relays individual to the various voting stations of the associated group. The other group relays controlled by the vote lock relay R340 perform similar functions.

The relay R335, upon operating, shortly following the operation of the group lock relay R290, closes its contacts 336 to complete an obvious circuit for energizing the control relay R330, the group open relay R280 and the other group open relays in parallel. In operating, the relay R330 opens its contacts 331 to interrupt the common portion of the operating circuits for the voting relays individual to the various voting stations, thus rendering these relays non-responsive to further key operations performed at the various voting stations. The group open relay R280, upon operating, opens its contacts 281 to 287, inclusive, to interrupt the initially completed locking circuits for the operated voting relays individual to the various voting stations. The other group open relays, in operating, perform similar functions. Thus the voting keys are positively locked out and cannot effectively be used until the equipment is subsequently released.

When the master switch 373 is closed by the operator, an obvious circuit is completed for energizing the driving motor 303 of the recorder 300. A circuit including the contacts of this switch and the cam actuated contacts 337 of the recorder is also completed for energizing the clutch operating magnet 313, whereby a driving connection is established between the motor 303 and the traveling carriage 301. The operation of the motor 303 also serves to drive the cams 374 and 376 in the manner previously pointed out. During the initial movement of these cams, and before the actual recording operation of the recorder 300 is started, the cam 374 operates to close the contacts 375, thereby to connect the release conductor C561 to the positive terminal of the current source. In the present case this operation is without effect, it being utilized for automatic release purposes in the manner explained fully hereinafter. Also during the preliminary movement of the carriage 301 the cam actuated springs 387 are opened to deenergize the clutch operating magnet 313, but before this occurs the clutch included in the driving connection between the motor 303 and the traveling carriage 301 is mechanically locked against release, so that movement of the carriage continues.

As the wipers 308 to 311, inclusive, which are carried by the carriage 301, traverse the associated stationary contact field, current pulses are transmitted to the recording magnets 304, 305, 306 and 307 and to the register or counting switches of the Aye, Nay and Present control units in accordance with the vote registrations set up in the voting relays individual to the various voting stations. For purposes of explanation, it may be assumed that the Present relay R220 and the Nay relay R250 individual to the stations 210 and 201, respectively, are operated during the recording operation. In such case a circuit is completed for energizing the Present magnet 306 when the wiper 310 engages the contact terminating the Present marking lead C369. This circuit extends from the positive terminal of the current source by way of the contacts 352, C367, the contacts 225, the Present marking lead C369, the wiper 310, the winding of the magnet 306, the wiper 315, and the wiping bar 314 to the negative terminal of the current source. When thus energized the magnet 306 operates to move the associated perforating plunger through its perforating position, so that the record card is perforated in the Present column opposite the name of the legislator for whose use the voting station 210 is provided. As the traveling carriage continues to move, the wiper 310 is disengaged from the contact terminating the marking conductor C369 so that the magnet 306 is deenergized and its armature is retracted in preparation for another card punching operation.

Concurrently with the energization of the Present magnet 306 a circuit is completed for energizing the pulsing relay R1100. This circuit extends from the positive terminal of the current source by way of the contacts 352, C367, the contacts 225, C369, the wiper 310, C566, the contacts 506, C569, the contacts 725, C750, and the winding of R1100 to the negative terminal of the current source. When thus energized the relay R1100 closes its contacts 1101 to complete an obvious circuit for energizing the magnet 1115. At its contacts 1102, the relay R1100 prepares a circuit for energizing the operating magnet 1125 of the tens counting switch 1120. Thereafter, and when the wiper 310 is disengaged from the contact terminating the marking lead C369, the pulsing relay R1100 is deenergized and restores to open the circuit for energizing the magnet 1115. When thus deenergized, the magnet 1115 in cooperation with its associated ratchet and pawl mechanism, not shown, functions to advance the wipers 1111 to 1114 one step in a clockwise direction wherein they engage their respective associated first contacts. At its contacts 1102, the relay R1100 opens the incomplete operating circuit for the magnet 1125. When the wipers of the switch 1110 are stepped off normal in a clockwise direction from engagement with their respective associated eleventh contacts, as shown in the drawings, into engagement with their respective associated first contacts in the manner just explained, the off-normal springs 1116 are moved into engagement to prepare certain operating and locking circuits described hereinafter.

As the carriage 301 continues to move a current pulse is transmitted to the Present magnet 306 and the pulsing relay R1100 in parallel each time a contact marked with positive potential is encountered by the wiper 310. Thus each Present vote marked in the stationary contact field of the recorder 300 is recorded in the form of a card perforation and is counted through operation of the Present counting register. In this regard it is pointed out that after nine current pulses are, through operation of the pulsing relay R1100, delivered to the operating magnet 1115 of the units counting switch 1110, the wipers of this switch engage their respective associated ninth contacts. With the wipers in this position if a tenth current pulse is received the pulsing relay R1100 operates to complete the operating circuit for the magnet 1125, this circuit extending from the positive terminal of the current source by way of the contacts 1102, the wiper 1112 and its engaged ninth contact, and the winding of the magnet 1125 to the negative terminal of the current source. Thereafter, and when the pulsing relay R1100 restores to interrupt this circuit, the magnet 1125 in cooperation with its associated ratchet and pawl mechanism, functions to advance the wipers 1121 to 1124, inclusive, into engagement with their respective associated first contacts. Simultaneously, the wipers of the units counting switch 1110 are advanced to engage their associated tenth contacts. With the wiper 1111 in this position an obvious alternative circuit, including the contacts 1117, is completed for energizing the magnet 1115 whereby this magnet is energized and deenergized to advance the wipers 1111 to 1114, inclusive, back to their respective normal positions wherein the off-normal springs 1116 are disengaged. When the wipers of the tens counting switch 1120 are moved off normal, the off-normal springs 1126 are moved into engagement to shunt the off-normal springs 1116. From the above explanation it will be apparent that the wipers of the tens counting switch 1120 are advanced one step in response to each ten current pulses transmitted to the pulsing relay R1100, so that if ninety current pulses are transmitted to the pulsing relay R1100, the wipers of the tens counting switch 1120 are operated through nine steps to engage their respective associated ninth contacts. When ten additional current pulses are transmitted to the pulsing relay R1100 a circuit is completed for energizing the two translating relays R1250 and R1260 in parallel. One branch of this circuit may be traced as extending from the positive terminal of the current source by way of the contacts 1102, the wiper 1112 and its engaged ninth contact, the wiper 1122 and its engaged ninth contact, C951, and the winding of R1250 to the negative terminal of the current source. The other branch of this circuit may be traced as extending from the positive terminal of the current source by way of the contacts 1102, the wiper 1112 and its engaged ninth contact, the wiper 1122 and its engaged ninth contact, C951, the contacts 921, C952, and the winding of R1260 to the negative terminal of the current source. When thus energized the two relays R1250 and R1260 close their contacts 1251 and 1261, respectively, to complete locking circuits which commonly include the conductor C950, the upper winding of the transfer relay R930 and the contacts 911. When these circuits are completed, the upper winding of the transfer relay R930 is short-circuited in a manner clearly apparent from the preceding explanation. At their remaining contacts, the relays R1250 and R1260 prepare the circuits for energizing the lamps 3, 7, 11, 15, 19 and 23 of the lamp panel 116. It will be understood that at the expiration of the hundredth current pulse transmitted to the pulsing relay R1100, this relay restores to deenergize the two magnets 1115 and 1125, whereby the wipers of the two counting switches 1110 and 1120 are operated to engage their respective associated tenth contacts. With the wiper 1121 in this position a circuit including the contacts 1127 is completed for energizing the magnet 1125, whereby this magnet is energized and deenergized immediately to advance the wipers 1121 to 1124, inclusive, to their respective normal positions wherein the off-normal springs 1126 are disengaged. In a similar manner the wipers of the units counting switch 1110 are automatically advanced to normal each time ten current pulses are counted by this switch. In restoring, the relay R1100 also opens the path short-circuiting the upper winding of the transfer relay R930, permitting this winding to be energized in series with the parallel connected relays R1250 and R1260. The resulting operation of the relay R930 is without effect.

The Aye and Nay votes with respect to the particular measure under consideration are recorded and counted in a manner substantially similar to that just described with reference to the Present votes. Thus when the carriage 301 is moved so that the wiper 308 carried thereby engages the contact terminating the Nay marking lead C375, current is transmitted to the magnet 304 over a circuit which extends from the positive terminal of the current source by way of the contacts 352, C367, the contacts 275, C375, the wiper 308, the winding of the magnet 304, the wiper 315, and the wiping bar 314 to the negative terminal of the current source. A branch of this circuit extends from the wiper 308 by way of the Nay pulsing lead C564, the contacts 508, C571, the contacts 723, C752, and the winding of the pulsing relay provided in the Nay control unit 122. Thus, current pulses are concurrently delivered to the Nay recording magnet 304 and the pulsing relay of the Nay counting register. The resulting operation of the magnet 304 and the Nay pulsing relay causes the registered Nay vote to be recorded and counted. In order more fully to explain the manner in which the votes are recorded and separately totaled, it is pointed out that the circuit over which the Aye recording magnet 305 is energized extends from any voting lead engaged by the wiper 309 and having positive potential thereon, by way of the winding of the magnet 305, the wiper 315 and the wiping bar 314 to the negative terminal of the current source. A branch of this circuit extends by way of the Aye pulsing lead C565, the contacts 507, C570, the contacts 724, C751 and the winding of the pulsing relay provided in the Aye counting register of the control unit 121 to the negative terminal of the current source. Thus current pulses are concurrently delivered to the Aye recording magnet 305 and the pulsing relay of the Aye counting register each time the wiper 309 engages a contact marked with positive potential. Non-voting registrations are recorded with respect to all voting stations at which no key operations have been performed. Thus it will be observed, by reference to the marking paths controlled by the relays R220, R230 and R240 individual to the voting station 210, that with all three of these relays restored, positive potential is impressed upon the non-voting lead C368. With the voting circuits individual to the station 210 arranged in this manner a circuit is completed for energizing the non-voting magnet 307 when the wiper 311 engages the contact terminating the lead C368. This circuit extends from the positive terminal of the current source by way of the contacts 352, C367, the contacts 244, 234 and 224, C368, the wiper 311, the winding of the magnet 307, the wiper 315, and the wiping bar 314 to the negative terminal of the current source. When energized over this circuit the magnet 307 operates the associated perforating plunger so that a perforation is made in the non-voting column opposite the space allotted to the station 210 on the record card. It will be observed that no provisions are made in the system for counting the number of stations at which no votes have been cast. It is apparent, however, that such provisions can be made in the system without departing from the scope of the invention herein disclosed.

As the traveling carriage 301 approaches the end of its movement, the clutch mechanism associated with the second traveling carriage 302 is, through the operation of a mechanical trip mechanism interconnecting the carriage 301 and the clutch mechanism associated with the carriage 302, clutched to its driving worm so that a driving connection is established between the motor 303 and the carriage 302. Shortly after movement of the carriage 302 across the associated contact and plunger fields is initiated, the traveling carriage 301 is de-clutched from its driving worm, whereby movement thereof is arrested. As the carriage 302 moves across its associated perforating plunger and contact fields, the votes registered in the contact field through previous operation of the keys provided at the stations associated with this contact field are automatically recorded and counted, in the exact manner described above. After all of the votes have been recorded and counted, and during the final movement of the carriage 302, the cam 376 functions to move the contacts 377 into engagement, thereby to complete an obvious circuit for energizing the release relay R360. At these contacts a circuit is also completed for energizing the pulse cut-off relay R720, this circuit extending from the positive terminal of the current source by way of the contacts 377, C567 and the winding of R720 to the negative terminal of the current source. The relay R360, in operating, opens its contacts 361 to interrupt the locking circuit for the voting relay R350. Assuming that the key 363 has been restored to normal, the relay R350 now restores and opens its contacts 351 further to interrupt its own locking circuit. At its contacts 352, the relay R350 disconnects the common conductor C367 from the positive terminal of the current source thereby to deenergize all of the operated voting relays, such, for example, as the relays R220 and R250 individual to the various voting stations. When the conductor C367 is disconnected from the positive terminal of the current source, the common relays R330, R335, R280, R290, etc., are also deenergized and restored.

The pulse cut off relay R720 in operating locks up in a circuit which extends from the positive terminal of the current source by way of C966, the contacts 702 and 721 and the winding of R720 to the negative terminal of the current source. At its contacts 722, the relay R720 prepares the operating circuit for the display control relay R730. At its contacts 723, 724 and 725, the relay R720 opens the circuits for delivering current pulses to the Aye, Nay and Present pulsing relays.

Shortly following the release of the relays common to the voting stations and the operation of the relay R720, and during continued movement of the cam 376, the contacts 377 are disengaged to interrupt the operating circuits for the relays R360 and R720. When thus deenergized, the relay R360 restores and closes its contacts 361 to reprepare or recomplete the locking circuit for the voting relay R350. Immediately after the contacts 377 are disengaged, the contact closing member 379 carried by the carriage 302 bridges the contact springs 380 to complete an obvious circuit for energizing the restoring solenoid 312 of the master switch 373. When this solenoid is energized the master switch is operated to its open-circuit position, in the usual manner, whereby the motor 303 is deenergized and operation of the recorder 300 is arrested. Thus the vote recording and counting operation is completed.

If desired the votes registered in the recorder 300 may be recorded on a number of record cards without affecting the setting of the counting switches following the first cycle of operation of the recorder. Thus, after the first recording cycle of the recorder is completed, the cut off relay R720 is operated to hold the pulsing circuits to the Aye, Nay and Present pulsing relays open. In order to repeat the recording operation, the keys 363 and 362 are left in their off-normal positions to prevent the automatic release of the operated voting relays and the common relays R350, R335, R330, R280, R290, etc., at the end of the first recording cycle. With these relays operated a second record card may be inserted in the card slot of the recorder and the master switch 373 may be operated to initiate a second cycle of operation of the recorder. If the voting key 363 is returned to normal during this second operating cycle of the recorder the voting relays and the associated common equipment is automatically released at the end of the cycle in the exact manner described above. On the other hand, if the key 363 is not restored to normal the momentary operation of the relay R360 at the end of the second recording cycle is without effect. If the automatic release relay R360 is not utilized to release the operated voting relays, they may be released by restoring the vote lock key 362 to normal, thereby to deenergize the relay R340. In releasing, the relay R340 opens the operating circuits for the relays R335 and R330 and the group open and group lock relays R280, R290 etc. The group lock relays, in restoring, open the locking circuits for the voting relays causing the same to restore. Shortly after the voting relays restore, the slow-to-release relay R330 releases to reprepare the operating and locking circuits for the voting relays.

*Manual display of the vote totals*

In order to display the information which has been set up in the various counting switches, the master station operator momentarily actuates the manual display key 518 to its off-normal position, wherein the contacts 519 are engaged to complete the prepared circuit for energizing the display control relay R730. This circuit extends from the positive terminal of the current source by way of the contacts 519 and 509, C572, the contacts 722 and the winding of the relay R730 to the negative terminal of the current source. When thus energized the relay R730 closes its contacts 731' to complete a locking circuit for itself. This circuit extends from the positive terminal of the current source by way of the operated off-normal springs 1116, 1126, etc., of the various counting switches and the contacts 911 in parallel, C966, the contacts 702 and 731' and the winding of R730 to the negative terminal of the current source. At its contacts 731 to 742, inclusive, the relay R730 completes circuits for energizing the translating relays which correspond to the settings of the counting switches individually associated with the lamp panels 109, 110, 113, 114, 117 and 118. In order to explain these circuits it may be assumed that 156 Present pulses were counted, 50 Aye votes were counted and 62 Nay votes were counted. In such case, it will be apparent from the preceding explanation that the wipers of the tens counting switch 1120 are left standing in engagement with their associated fifth contacts, and the wipers of the units counting switch 1110 are left standing in engagement with their associated sixth contacts at the end of the recording and counting operations. In regard to the two counting switches of the Aye unit 121, the wipers of the tens counting switch in this unit engage their associated fifth contacts and the wipers of the units counting switch of this unit are at normal at the end of the recording and counting operations. With respect to the two counting switches embodied in the Nay unit 122, the wipers of the tens counting switch of this unit engage their associated sixth contacts and the wipers of the units counting switch engage their associated second contacts. With the various counting switches standing in the positions indicated, the relay R730, in operating, completes circuits for energizing the second and fifth translating relays R1210 and R1240 in the group associated with the lamp panel 117, as will be apparent from the chart forming Fig. 14 of the drawings. The circuit for energizing the relay R1210 extends from the positive terminal of the current source by way of the off-normal springs 1116, 1126, etc., of the various counting switches and the contacts 911 in parallel, C966, the contacts 741, C768, the wiper 1123 and its engaged fifth contact, C954, and the winding of R1210 to the negative terminal of the current source. The circuit for energizing the fifth translating relay R1240 of the same group may be traced as extending by way of the conductor C966, the contacts 742, C769, the wiper 1124 and its engaged fifth contact, C957, and the winding of R1240 to the negative terminal of the current source. From a consideration of the bank contact wiring of the contact sets associated with the two wipers 1123 and 1124, it will be apparent that the translating relays R1200, R1210, R1220, R1230 and R1240, are energized in pairs in accordance with the translation code given in Fig. 14 of the drawings. Thus when the wipers 1123 and 1124 engage their associated first contacts, the first and fifth translating relays R1200 and R1240 are energized during the display period. When these wipers engage their associated third contacts, on the other hand, the second and fourth translating relays R1210 and R1230 are energized during the display period. In the case under consideration the two relays R1210 and R1240, in operating, close their contacts 1211 and 1241, respectively, to establish the previously traced locking circuits for themselves, and in so doing short-circuit the tens transfer relay R940 in the manner previously explained.

In a manner similar to that just described, the first and third translating relays of the group associated with the lamp panel 113 are energized in response to operation of the display control relay R730. The circuit for energizing the first translating relay of this group may partially be traced as extending by way of the common conductor C966, the contacts 739, C766, the wiper 1113 and its engaged sixth contact, the conductor C959 and the winding of the first translating relay of the indicated group to the negative terminal of the current source. The circuit for energizing the third translating relay of the group individual to the panel 113 extends by way of the common conductor C966, the contacts 740, C767, the wiper 1114 and its engaged sixth contact, C961, and the winding of the third translating relay in the indicated group to the negative terminal of the current source. Thus the numbers 5 and 6, respectively, are set up in the translating relay groups associated with the lamp panels 117 and 113, respectively. In this regard it will be recalled that the two translating relays R1250 and R1260 are operated to establish circuits for energizing the digit 1 lamps in the display panel 116 during the display period.

The manner in which the display control relay R730 functions to energize selected ones of the translating relays in the Aye and Nay control units 121 and 122, respectively, in accordance with the settings of the counting switches embodied in these units is exactly the same as just described with reference to the control of the translating relays controlling Present display unit. In this regard it is noted that the leads C758, C759, C760 and C761 are utilized in energizing the selected translating relays in the groups individually associated with the lamp panels 109 and 110, and the leads C762, C763, C764 and C765 are utilized in energizing the selected translating relays forming the groups individually associated with the lamp panels 113 and 114. As the selected translating relays in the groups individual to the lamp panels 109 and 113 operate they lock up and short circuit their respective associated tens transfer relays in the manner previously explained.

The actual energization of the selected lamps in the Aye, Nay and Present lamp panels is effected through operation of the display power relays R530, R540 and R550. Thus when the manual display key 518 is momentarily operated to its off-normal position, circuits are completed for energizing each of the indicated power relays. More specifically, the operating circuit for the relay R530 extends from the positive terminal of the current source by way of the contacts 519, 509 and 502, and the winding of R530 to the negative terminal of the current source. The circuit for energizing the relay R540 extends from the positive terminal of the current source by way of the contacts 519, 509, 503 and the winding of R540 to the negative terminal of the current source. The circuit for energizing the relay R550 extends from the positive terminal of the current source by way of the contacts 519, 509, 504 and the winding of R550 to the negative terminal of the current source. These relays, in operating, establish locking circuits for themselves, in the manner previously described, and also connect the Present, Aye and Nay display leads C576, C577, C579, C580, C582 and C583 to opposite terminals of the current source, so that the selected display lamps of the lamp panels 109, 110, 113, 114, 115, 117 and 118 are energized. Thus a display of the vote totals registered in the various counting switches is effected.

*Manual release*

In order to release the operated relays of the Present, Aye and Nay control units, and to restore the counting switches of these units to normal, thereby to wipe out the Aye, Nay and Present displays, the master station operator operates the manual release key 516 to its off-normal position, wherein the contacts 517 are engaged to complete a circuit for energizing the release relay R700. In this regard it is pointed out that when the release of the equipment is to be effected manually, the release transfer key 513 is maintained in a position such that the contacts 515 are engaged and the contacts 514 are disengaged. The circuit for energizing the release relay R700 extends from the positive terminal of the current source by way of the contacts 517 and 515, C962, and the winding of R700 to the negative terminal of the current source. In operating, the relay R700 locks in a circuit including the contacts 708 and the conductor C966 and opens its contacts 702 to interrupt the locking circuits for the relays R720 and R730, whereby these two relays are deenergized and restore. At its contacts 701 and 703 to 707, inclusive, the relay R700 connects the release conductors C460 and C753 to C757, inclusive, to the positive terminal of the current source over a path including the conductor C966 and the operated off-normal springs of the various counting switches. More specifically, when the contacts 707 are closed a circuit is completed for energizing the Present release relay R910 in parallel with the operating magnet 1115 of the units counting switch 1110. This circuit extends from the positive terminal of the current source by way of the conductor C966 and the contacts 707 to C757 where it divides, one branch extending through the winding of the release relay R910 to the negative terminal of the current source, and the other branch extending by way of the wiper 1111 and its engaged fifth contact, the contacts 1117 and the winding of the magnet 1115 to the negative terminal of the current source. At its contacts 911, the relay R910, upon operating, opens one of the paths over which the lead C966 is connected to the positive terminal of the current source. Due to the action of the contacts 1117 included in the above-traced circuit for energizing the magnet 1115, this magnet operates buzzer fashion to drive the wipers of the switch 1110 to normal, at which time the operating circuit for the magnet 1115 is opened in an obvious manner. When the switch 1110 is thus restored to normal, the off-normal springs 1116 are disengaged to open another of the multiple paths over which the common conductor C966 is connected to the positive terminal of the current source. At its contacts 706, the release relay R700, in operating, completes a circuit including the release conductor C756 and the wiper 1121 for energizing the magnet 1125. Due to the action of the contacts 1127 included in this circuit, the magnet 1125 operates buzzer fashion to drive the wipers of the switch 1120 to normal, at which time the circuit for energizing the magnet 1125 is opened in an obvious manner. When the wipers of this switch are returned to normal the off-normal springs 1126 are opened to interrupt another of the multiple paths over which the common conductor C966 is connected to the positive terminal of the current source. The manner in which the Aye and Nay translating and transfer relays and the counting switches embodied in the units 121 and 122 are restored to normal will be clearly apparent from the above explanation with respect to the release of the Present control unit 120. It will be noted that when the six counting switches of the three units have been restored to normal, all of the multiple paths for connecting the common conductor C966 to the positive terminal of the current source are opened, due to disengagement of the off-normal springs respectively controlled by these switches. When this lead is disconnected from the positive terminal of the current source, the relay R700, the Aye, Nay and Present transfer, translating and release relays, and the Aye, Nay and Present display power relays are all deenergized and restore, thus effecting the final step in the release of the equipment.

From the preceding explanation it will be understood that the key 516 may be utilized to control the release of the control equipment in those instances where the set-up and digit keys are used to set up desired totals in the translating relays. Thus, following the manual set-up of and display of desired totals in the display units, the release key 516 may subsequently be operated to initiate the release of the control units and the wipe out of the display. When the key 516 is operated, the release relay R700 is energized and operates. In operating, this relay closes its contacts 701 and 703 to 708, inclusive, to complete the previously traced operating circuits for the Present, Aye and Nay release relays. The release relays in operating cause the release of the associated translating and transfer relays and the deenergization of the display lamps in the manner explained above. After all of the lamps of the various lamp panels are deenergized, the operator may release the key 516, thereby to cause the deenergization and release of the relay R700, the release relays, and the display power relays, it being noted that the release relays are the last to restore. Thus, the equipment is fully restored to normal.

Automatic Display

In the event it is desired automatically to display the Aye, Nay and Present vote totals accumulated during a recording and counting operation, the transfer key 509 is operated to its automatic display position prior to the operation of the recorder 300. With the transfer key 509 in this position the contacts 509 are disengaged, the contacts 510 are engaged, and the remaining contacts of this switch occupy the positions illustrated in the drawings. With the key 509 in this position the recorder 300, in completing its operation to record the action taken with respect to a particular bill, functions to complete the previously traced circuit for energizing the pulse cut-off relay R720. When thus energized the relay R720 completes its locking circuit and closes a circuit for energizing the display control relay R730, this circuit extending from the positive terminal of the current source by way of the contacts 377, C567, the contacts 510, C572, the contacts 722, and the winding of R730, to the negative terminal of the current source. In operating, the relay R730 locks up and initiates the operations required to effect the display of the numbers posted in the three adding units, all in the exact manner explained above with reference to the manual control of these units. It will be noted that the operating circuit for the pulse cut-off relay R720 is interrupted at the contacts 377 when the recording cycle is fully completed, thus placing the release of the adding units and the wipe-out of the display under the control of the master station operator.

Automatic Display-Automatic Release

In the event it is desired to control the adding units in a fully automatic manner, such that the display of the totals posted in the counting registers during a recording operation and the release of control units is under the control of the recorder 300, the transfer key 509 is operated to its automatic display position in the manner just explained, and the release transfer key 513 is operated to its automatic release position wherein the contacts 514 are engaged and the contacts 515 are disengaged. With the keys arranged in this manner the totals posted in the counting switches are automatically displayed at the end of a vote recording operation, in the exact manner set forth above. This display remains on the board 100 until such time as operation of the recorder 300 is subsequently initiated to record another vote. When this subsequent operation of the recorder 300 occurs, the cam 374, during the preliminary movement of the carriage 301, functions momentarily to close the contacts 375, thereby to complete the prepared operating circuit for the automatic release relay R700. This circuit extends from the positive terminal of the current source by way of the contacts 375, C561, the contacts 514, C562, and the winding of R700 to the negative terminal of the current source. When thus energized, the relay R700 operates, locks up in a circuit including the contacts 706 and the conductor C966, and initiates the release of the three control units in the exact manner set forth above with reference to the manual release of this equipment. When the counting switches are all restored to normal the relay R700, the Aye, Nay and Present display power relays and the Aye, Nay and Present release relays are deenergized and restore in the manner explained above. The automatic release of the control units is effected during the preliminary movement of the traveling carriage 301 and prior to the recording of any votes by the recorder 300. Thus the three adding units are conditioned to respond to the current pulses transmitted thereto during the ensuing cycle of operation of the recorder 300, before the vote recording is started.

While there has been described what is at present considered to be the preferred embodiment of the invention, it will be understood that various modifications may be made therein, and it is contemplated to cover in the appended claims all such modifications as fall within the true spirit and scope of the invention.

What is claimed is:

1. A vote indicating system comprising a display unit for displaying a vote total, a plurality of voting stations each including means for casting a vote, means controlled in accordance with the votes cast at said stations for determining the total to be displayed by said unit, manually operable means for selecting a desired total to be displayed by said unit, and transfer means for rendering either of said two last-named means operative to control said unit.

2. A vote indicating system comprising a display unit for displaying a number, a plurality of voting stations each including instrumentalities for casting a vote, means for automatically totaling the votes cast at said stations, means for automatically causing said unit to display the number of said total, other means for causing said unit to display another number, and means for selectively rendering said second means and said third means operative to control said unit.

3. A vote indicating system comprising a plurality of display units for displaying vote totals of different character, a plurality of voting stations each including instrumentalities for casting votes of different character, means for automatically and separately totaling the votes of different character cast at said stations, means for controlling said display units to display the respective corresponding totals as determined by said last-named means, means for controlling said units to display other totals, and means for selectively rendering said second means and said third means operative to control said unit.

4. In a vote indicating system, a display unit for displaying a vote total, manually operable means for determining the total to be displayed by said unit, vote counting apparatus for automatically determining the total to be displayed by said unit, manually operable means for causing said unit to display a vote total as determined by said apparatus, means for automatically controlling said unit to display a vote total as determined by said apparatus, and means for selectively rendering any of the previously named means operative to control said unit.

5. A vote indicating system comprising a display unit for displaying a vote total, translating means for determining the setting of said display unit and having different settings individually corresponding to different totals to be displayed by said unit, means including a plurality of digit keys for manually controlling the setting of said translating means, a plurality of voting stations each including means for casting a vote, counting means operative automatically to total the votes cast at said stations and to cause a corresponding setting to be imparted to said translating means, and means for selectively rendering said digit keys and said counting means effective to control said translating means.

6. A vote indicating system comprising a display unit for displaying a vote total comprising two or more digits, translating relays arranged in groups for individually determining the values of the different digits, a set of code leads, a plurality of digit keys, means including said digit keys and one or more group transfer relays for successively controlling the different groups of translating relays over said code leads to impart desired settings thereto, a plurality of voting stations each including means for casting a vote, counting means operative automatically to total the votes cast at said stations, means for controlling said translating relays to impart settings to the different groups thereof which respectively correspond to the digit values of the total registered in said counting means, and transfer means operative selectively to render said digit keys and said counting means effective to determine the settings of said translating relays.

7. A vote indicating system comprising a display unit for displaying a vote total comprising two or more digits, translating relays arranged in groups for individually determining the values of the different digits, a set of code leads, a plurality of digit keys, means including said digit keys and one or more group transfer relays for successively controlling the different groups of translating relays over said code leads to impart desired settings thereto, a plurality of voting stations each including means for casting a vote, counting means operative automatically to total the votes cast at said stations, manually operable means for controlling said translating relays to impart settings to the different groups thereof which respectively correspond to the digit values of a total registered in said counting means, control means for automatically controlling said translating relays to impart settings to the different groups thereof which respectively correspond to the digit values of the total registered in said register means, and means for selectively rendering said digit keys, said manually operable means and said control means operative to control said translating relays.

8. In a vote indicating system, a display unit including a plurality of lamps arranged to be energized in different combinations to display different vote totals, a vote recorder for automatically recording different votes, means controlled by said recorder for selecting for energization the lamps required to display the total of the votes recorded by said recorder during a vote recording operation, and means thereafter controlled by said recorder for automatically energizing the selected lamps.

9. In a vote indicating system, a display unit including a plurality of lamps arranged to be energized in different combinations to display different vote totals, a vote recorder for automatically recording votes, means controlled by said recorder for selecting for energization the lamps required to display the total of the votes recorded by said recorder during one vote recording operation, means for thereafter energizing the selected lamps, and means responsive to the initiation of the operation of said vote recorder during a succeeding vote recording operation of said recorder for deenergizing the selected lamps.

10. In a vote indicating system, a display unit including a plurality of lamps arranged to be energized in different combinations to display different vote totals, a vote recorder for automatically recording different votes, means controlled by said recorder for selecting for energization the lamps required to display the total of the votes recorded by said recorder during a vote recording operation, means thereafter controlled by said recorder for automatically energizing the selected lamps, and means responsive to the initiation of the operation of said recorder during a succeeding vote recording operation for deenergizing the selected lamps.

11. In a vote indicating system, a plurality of display units for displaying vote totals of different character, each of said units including a plurality of lamps arranged to be energized in different combinations to display different vote totals, a vote recorder for automatically recording votes of said different character, means controlled by said recorder for separately selecting for energization the lamps of said display units which are required to display the respective totals of the votes of different character recorded by said recorder, display relays individually associated with said display units and each operative to control the energization of the selected lamps of the associated unit, and means controlled by said recorder for concurrently energizing said display relays after the termination of the vote recording operation of said recorder.

12. In a vote indicating system, a plurality of display units for displaying vote totals of different character, each of said units including a plurality of lamps arranged to be energized in different combinations to display different vote totals, a vote recorder for automatically recording votes of said different character, means controlled by said recorder for separately selecting for energization the lamps of said display units which are required to display the respective totals of the votes of different character recorded by said recorder, display relays individually associated with said display units and each operative to control the energization of the selected lamps of the associated unit during a vote recording operation of said recorder, means controlled by said recorder for concurrently energizing said relays after the termination of said vote recording operation, locking circuits for said relays, and means controlled by said recorder for completing said locking circuits after the termination of said vote recording operation and for interrupting said locking circuits before a succeeding vote recording operation of said recorder is completed.

13. In a vote indicating system, a plurality of display units for displaying vote totals of different character, each of said units including a plurality of lamps arranged to be energized in different combinations to display different vote totals, means for casting votes of different character, means controlled in accordance with the total votes of each character cast for separately selecting the lamps of said display units which are required to display the said vote totals, display control devices individually associated with said display units and each operative to control the energization of the selected lamps of the associated unit, means for concurrently operating said devices as a group, and means for selectively operating said devices.

14. In a vote indicating system, a master station, a plurality of voting stations each including voting elements operable to cast votes of different character, voting relays individually corresponding to said voting elements and each arranged to be controlled by the corresponding voting element, means controllable from said master station for rendering said relays controllable by their respective corresponding voting elements, voting circuits individually controlled by said voting relays, means controllable from said master station for rendering said relays non-controllable by their respective corresponding voting elements without releasing any operated ones thereof and without rendering said voting elements non-operable, and vote indicating means controlled over said voting circuits.

15. In a vote indicating system, a master station, a plurality of voting stations each including voting elements operable to cast votes of different character, voting relays individually corresponding to said voting elements and each arranged to be controlled by the corresponding voting element, means controllable from said master station for rendering said relays controllable by their respective corresponding voting elements, voting circuits individually controlled by said voting relays, means controllable from said master station for rendering said relays non-controllable by their respective corresponding voting elements without releasing any operated ones thereof, vote indicating means controlled over said voting circuits to indicate the votes indicated by operated ones of said relays, and means controlled by said vote indicating means for releasing the operated ones of said relays after the votes designated thereby are indicated.

16. In a vote indicating system, a master station, a plurality of voting stations each including voting elements operable to cast votes of different character, voting relays individually corresponding to said voting elements and each arranged to be controlled by the corresponding voting element, means controllable from said master station for rendering said relays controllable by their respective corresponding voting elements, voting circuits individually controlled by said voting relays, lockout means controlled by said voting relays for preventing more than one voting relay individual to each voting station from being concurrently operated, means controllable from said master station for rendering said relays non-controllable by their respective corresponding voting elements without releasing any operated ones thereof, vote indicating means controlled over said voting circuits to indicate the votes indicated by operated ones of said relays, and means controlled by said vote indicating means for releasing the operated ones of said relays after the votes designated thereby are indicated.

LEONARD F. CRABTREE.

REFERENCES CITED

The following references are of record in the file of this patent:

UNITED STATES PATENTS

| Number | Name | Date |
|---|---|---|
| 934,498 | Bohan et al. | Sept. 21, 1909 |
| 1,005,555 | Kettering | Oct. 10, 1911 |
| 1,219,053 | Thompson et al. | Mar. 13, 1917 |
| 1,380,557 | Hines | June 7, 1921 |
| 1,438,306 | Heiny | Dec. 12, 1922 |
| 1,877,150 | Thompson | Sept. 13, 1932 |
| 1,938,526 | Limb | Dec. 5, 1933 |
| 1,967,887 | Johnston | July 24, 1934 |
| 2,133,755 | Pereyra | Oct. 18, 1938 |
| 2,031,298 | Belas et al. | Feb. 18, 1936 |
| 2,066,698 | Simpson | Jan. 5, 1937 |
| 2,146,576 | Haselton et al. | Feb. 7, 1939 |
| 2,219,347 | Thompson | Oct. 29, 1940 |
| 2,326,204 | Dowey et al. | Aug. 10, 1943 |